(12) United States Patent
Ng

(10) Patent No.: US 10,997,103 B2
(45) Date of Patent: May 4, 2021

(54) METHOD AND SYSTEM FOR ENABLING USB DEVICES TO OPERATE AS INTERNET OF THING (IOT) DEVICES BASED ON THING DESCRIPTION MODEL

(71) Applicant: U-THING TECHNOLOGY LIMITED, Hong Kong (CN)

(72) Inventor: Wing Hon Ng, Hong Kong (CN)

(73) Assignee: U-THING TECHNOLOGY LIMITED, Hong Kong (CN)

( * ) Notice: Subject to any disclaimer, the term of this patent is extended or adjusted under 35 U.S.C. 154(b) by 0 days.

(21) Appl. No.: 16/570,343

(22) Filed: Sep. 13, 2019

(65) Prior Publication Data
US 2020/0089637 A1 Mar. 19, 2020

Related U.S. Application Data

(60) Provisional application No. 62/731,955, filed on Sep. 16, 2018.

(51) Int. Cl.
*G06F 16/903* (2019.01)
*G06F 40/205* (2020.01)
*G06F 13/38* (2006.01)
*G06F 16/93* (2019.01)
*G06F 13/12* (2006.01)

(52) U.S. Cl.
CPC .......... *G06F 13/385* (2013.01); *G06F 13/126* (2013.01); *G06F 16/903* (2019.01); *G06F 16/93* (2019.01); *G06F 40/205* (2020.01); *G06F 2213/0042* (2013.01)

(58) Field of Classification Search
CPC ...... G06F 13/385; G06F 16/903; G06F 16/93; G06F 40/205; G06F 13/126; G06F 2213/0042
See application file for complete search history.

(56) References Cited

U.S. PATENT DOCUMENTS

| | | | |
|---|---|---|---|
| 2014/0289366 A1* | 9/2014 | Choi | G06F 9/4451 709/218 |
| 2015/0347114 A1* | 12/2015 | Yoon | G06F 8/61 235/375 |
| 2018/0270079 A1* | 9/2018 | Chamarajnager | H04L 12/2832 |
| 2020/0021670 A1* | 1/2020 | Agerstam | H04L 67/12 |

* cited by examiner

*Primary Examiner* — Tim T Vo
*Assistant Examiner* — Harry Z Wang
(74) *Attorney, Agent, or Firm* — Raymond Nuzzo

(57) ABSTRACT

The present invention is directed to a system and method that utilizes a central repository for storing and sharing Thing Description (TD) Documents with USB extensions that correspond to specific USB I/O schema. A Network Interface Module uses the USB I/O vendor and product identifications to query the central repository and download the appropriate Thing Description (TD) document for the specific USB I/O device. The Network Interface Module parses the TD document and builds the appropriate Web of Things (WoT) data architecture that establishes the interface between the network and the USB I/O device thereby allowing the USB I/O device to become an IoT device.

10 Claims, 22 Drawing Sheets

System Centric I/O

Device Driver in Window OS

Example of an USB Aquarium Control Center – Thing Model

| Functional Model | Thing Model | | |
|---|---|---|---|
| | Property | Action | Event |
| • Air Pump with power control | Air Pump State | Air pump toggle | |
| • Heater<br>• Temp sensor with control<br>• Temp limit exceed alarm | Water Temperature | Thermostat Level | Exceed temp limit alarm |
| • Food dispense control<br>• Food box empty alarm | Food Box Status | Dispense number of food unit | Food Box Empty Alarm |

Fig. 20

METHOD AND SYSTEM FOR ENABLING USB DEVICES TO OPERATE AS INTERNET OF THING (IOT) DEVICES BASED ON THING DESCRIPTION MODEL

CROSS REFERENCE TO OTHER PATENT APPLICATIONS

This application claims the benefit of U.S. provisional patent application No. 62/731,955, filed Sep. 16, 2018, which is hereby incorporated by reference in its entirety for all purposes.

This application also relates to U.S. provisional patent application No. 62/564,234, filed Sep. 27, 2017. The entire disclosure of U.S. application No. 62/564,234 is hereby incorporated by reference.

STATEMENT OF GOVERNMENT INTEREST

Not applicable.

FIELD OF THE INVENTION

The present invention relates to a method and system for converting a USB device to an Internet of Things (IoT) device using corresponding Thing Description (TD) documents retrieved from a central repository.

BACKGROUND

The Internet of Things (IoT) has been receiving much attention due to the popularity of handheld devices such as smart phones, tablets and similar devices that are used for displaying information as well as remotely controlling different electronic or electrical devices through a data network such as the Internet.

Universal Serial Bus (USB) is an industry standard definition for cables, connectors and protocols for connection, communication and power supplies between personal computers and their peripheral devices. For example, USB was originally defined as a peripheral bus for personal computers that unified all I/O interfaces to a single standard bus. The USB standard keeps evolving and replacing all other standard connections such as parallel printer ports, serial ports and video ports. The USB's recent update USB 3.1 significantly enhances the data speed and power supply capacity that allows USB devices to transfer data at rates up to 10GBPS and to sink up to 100 watts of power. With a well-defined interface structure, the USB can now accommodate a larger variety of electronic devices in addition to computer peripheral devices. As a result of updated USB standards, support has extended to embedded applications such as household appliances, music players, video recorders, etc. which have a USB socket to accept a USB memory stick for data storage (e.g. music, video data storage, etc.). Besides the physical connection, the USB has a unique logic architecture definition such that the communication between a personal computer (PC) and peripheral device can be setup systematically and can be extended to any kind of peripheral function. With the launch of the enhanced Power Delivery (PD), the power sink of the peripheral device can be up to 100 W thereby extending the functionality of the peripheral device. As a result of such expanded functionality, USB devices will not be restricted to only PC peripheral devices but may be applied to any kind of I/O device. For example, practically all mobile phones today use USB-C as the power and communication interface. Thus, USB interface can be chosen as the standard for a new generation of I/O devices, including devices such as household appliances, provided that the power and speed requirements are within the coverage limit of the USB interface.

Referring to FIG. 1, USB devices 101 and USB hub 103 were originally used only with personal computers 102 and corresponding device drivers in order to interface with different kinds of USB peripheral devices. In conventional systems, a device driver 204 (see FIG. 3) is required to allow the personal computer (PC) operating system 201 to drive the specific USB hardware. Each USB device uses either a unique device driver 204 or adopts the corresponding defined class driver so that the upper application layer 206 is able to use the USB I/O (see FIG. 3). As is well known in the art, the Windows OS 201 includes a Kernel Mode 202 and User Mode 203. The Kernel Mode includes the Kernel Mode Client Driver as well as USB Host Controller and Driver 205. The User Mode 203 includes the User-Mode Client Driver, the Windows API and the upper application layer 206. USB device driver 104 can be locally loaded onto the operating system or remotely loaded onto the operating system from a central repository 105 (see FIG. 2) which may be a vendor's web site. These specific drivers are required in order for the USB I/O device to operate under the hardware and operating system. USB devices are mostly built for PC applications and current defined device-classes are confined for PC applications. Adopting the USB connection technology for IoT applications will expand the variety of applications for USB I/O devices. The existing defined device-classes are not capable of covering IoT applications. Therefore, new device drivers are necessary for new USB applications. The original design of a device driver is highly dependent on the operating system (OS) such as Windows, Linux or other embedded OS. A further disadvantage is that the device driver is also dependent upon the particular version of the OS. Such a situation complicates the development and maintenance of the device drivers by the USB I/O device manufacturers. FIG. 1 shows standard connections between USB peripheral devices 101 and a main personal computer (PC) system 102 either directly or via a USB hub 103. The configuration shown in FIG. 1 is a conventional system-centric I/O configuration wherein all I/O devices are connected to and controlled by the combination of the personal computer CPU system and its operating system (OS). All I/O operation is built upon upper application layer 206 (see FIG. 3).

Typically, in conventional systems, the USB host controller learns about all of the USB device descriptors through the enumeration process. The operating system (OS) then loads the corresponding USB device drivers of the specific USB device or uses the standard class driver and establishes the communication pipes with the corresponding endpoints via the USB host controller. The USB device driver works under the operating system (OS) to establish the specific communication with the attached USB device via low-level USB system software. However, this USB device driver is dependent upon the operating system (OS) and is thus OS-centric. As a result, USB device manufacturers must follow the specification of the OS that is used. The main disadvantage of OS-dependent USB device drivers is that the user of the USB device has less autonomy regarding the choice of platform hardware and software and must follow the specification of the OS being used.

What is needed is a new and improved system and method for interfacing a USB I/O device with a network that allows the USB I/O device to function as an IoT device but which does not require specific drivers to be built for that USB I/O device and does not require modification to that USB I/O device.

SUMMARY OF THE INVENTION

The present invention is directed to a system and method that utilizes a central repository for storing and sharing the Thing Description (TD) Documents with USB extensions that correspond to specific USB I/O schema. A Network Interface Module uses the USB I/O vendor and product identifications to query the central repository and download the appropriate Thing Description (TD) document for the specific USB I/O device. The Network Interface Module parses the TD document and builds the appropriate Web of Things (WoT) data architecture that establishes the interface between the network and the USB I/O device thereby allowing the USB I/O device to become an IoT device. In this approach, there is the workload on the Network Interface Module that is configured to adopt the USB I/O according to the Thing Description Document and convert the combined system to an IoT as shown in FIG. 4.

Accordingly, in some embodiments, the present invention is directed to a system and method for enabling any USB I/O device to operate as IoT device. A central repository is provided and configured to store the Thing Description (TD) document which defines a WoT data model corresponding to the specific USB function of the USB I/O device. A Network Interface Module implements the enumeration process to obtain the unique Vendor ID (Identification) or VID and Product ID (Identification) or PID corresponding to the USB I/O device. The unique Vendor ID and Product ID identifiers are used as query keys in locating and retrieving the corresponding Thing Description (TD) document, via the Internet, from the central repository. The Network Interface Module utilizes the retrieved Thing Description (TD) document to construct the data communication pipes that are compatible with the specific USB I/O device thereby enabling the USB I/O device to interface and communicate with the network as an IoT device.

The present invention provides the following novel features, benefits and advantages:
a) USB I/O devices will no longer be dependent on any one particular operating system (OS) such as Microsoft Windows, Apple MacOS, Chrome OS or Linux operating system;
b) relies on an I/O-centric platform rather than a OS-centric platform;
c) reduces the resources requirement of the interface hardware platform;
d) eliminates the need to implement a device driver for a specific USB I/O device;
e) substantially reduces the need to develop and maintain device drivers;
f) USB device manufacturers have more autonomy in defining the functionality of the USB device and such definition becomes part of the Thing Document (TD) description;
g) allows constructing just one Thing Document (TD) description for a particular USB I/O device and centrally storing the constructed Thing Document (TD) description, wherein the centrally stored Thing Document (TD) description will work on any platform in perpetuity; and
h) plug and play capability.

Although the ensuing description is in terms of USB I/O devices, it is to be understood that the present invention may be applied to or used with devices having I/O architecture other than USB I/O architecture, such as PCI, Thunderbolt, etc.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

BRIEF DESCRIPTION OF THE DRAWINGS

FIG. 20 is a table presentation of the Thing Model Interaction equivalent of the USB Aquarium Control Center shown in FIG. 19;

DESCRIPTION OF THE EXEMPLARY EMBODIMENTS OF THE INVENTION

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

As used herein, "USB" means "Universal Serial Bus".
As used herein, "I/O" means "input/output".
As used herein, "NIM" means "Net Interface Module".
As used herein, "IoT" means "Internet of Things".
As used herein, "WoT" means "Web of Things".
As used herein, "TD" means "Thing Description".
As used herein, "OS" means "operating system".
As used herein, "network" shall mean multiple devices that are in communication with each other and includes, but is not limited to, personal area network (PAN), a wireless personal area network (WPAN), local area networks (LAN), a wireless LAN (WLAN), wide area networks (WAN), a wireless WAN (WWAN), a metropolitan area network (MAN), a cellular telephone network, an intranet, an extranet, a virtual private network (VPN) or combination of two or more of these. A "network" may also include multiple devices that are in communication with each other using the Internet or World Wide Web.

Figure 1:
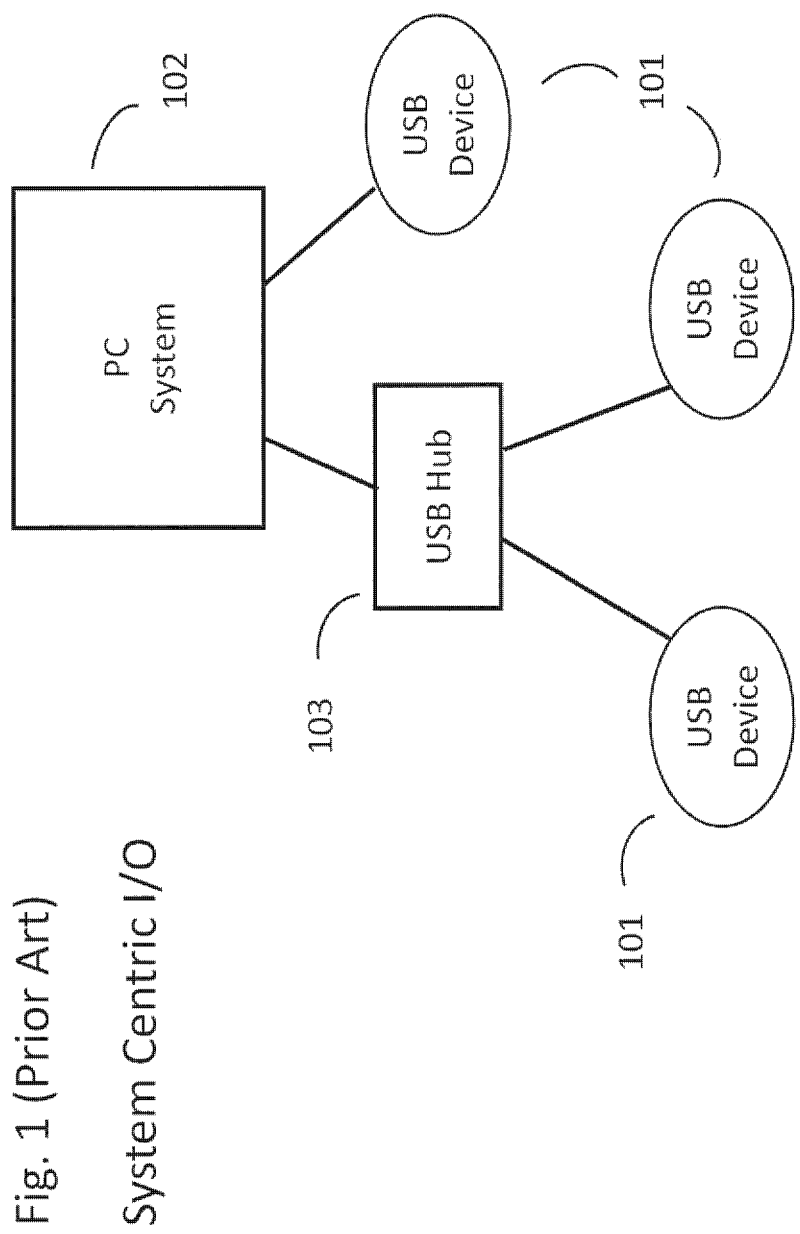
FIG. 1 is a block diagram illustrating a conventional system-centric USB input/output configuration wherein USB peripherals are attached to a main personal computer (PC) system either directly or via a USB hub.
Figure 2:
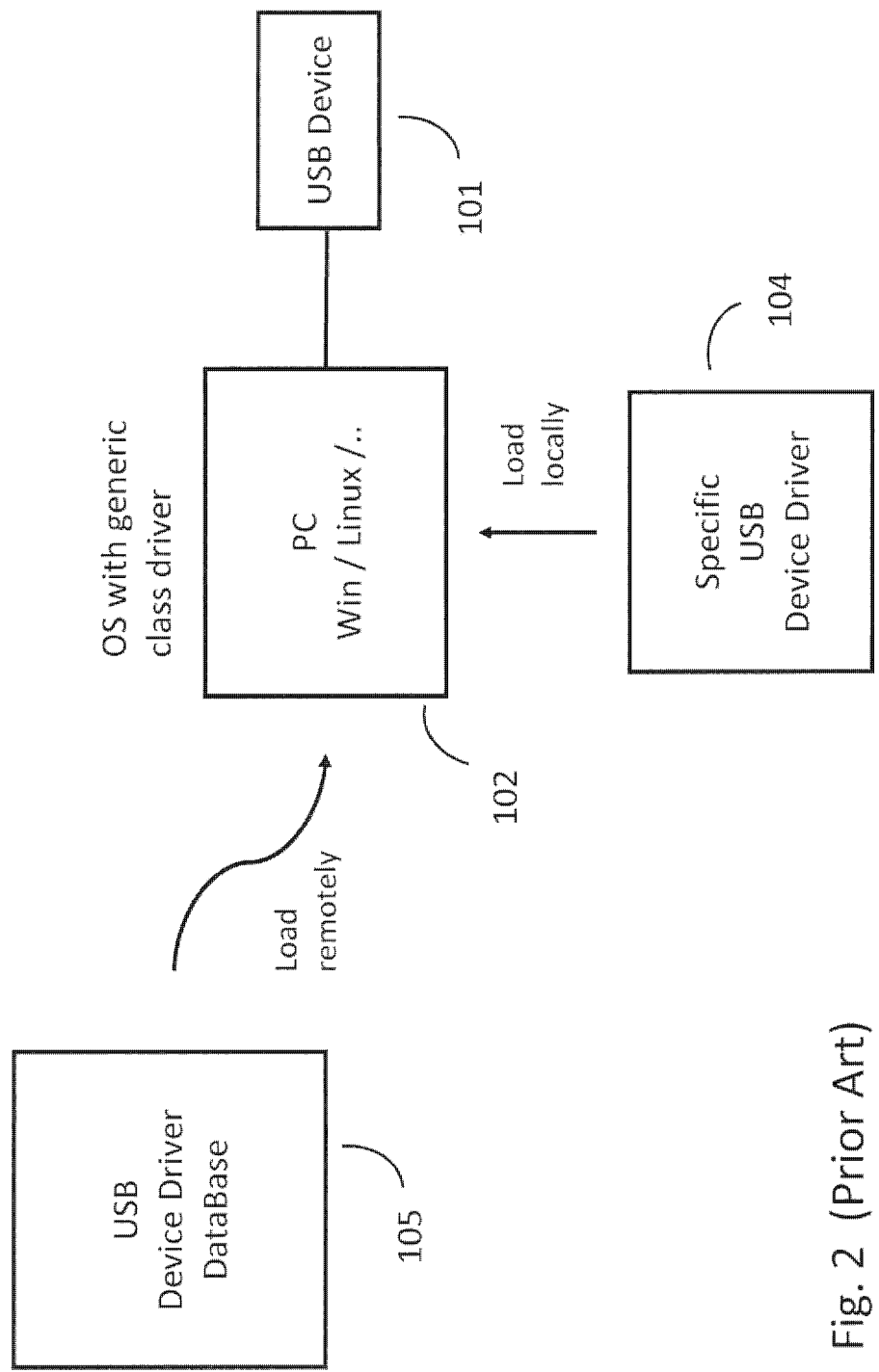
FIG. 2 is a block diagram showing USB device drivers being loaded onto an operating system either locally or remotely from a database in accordance with conventional techniques.
Figure 3:
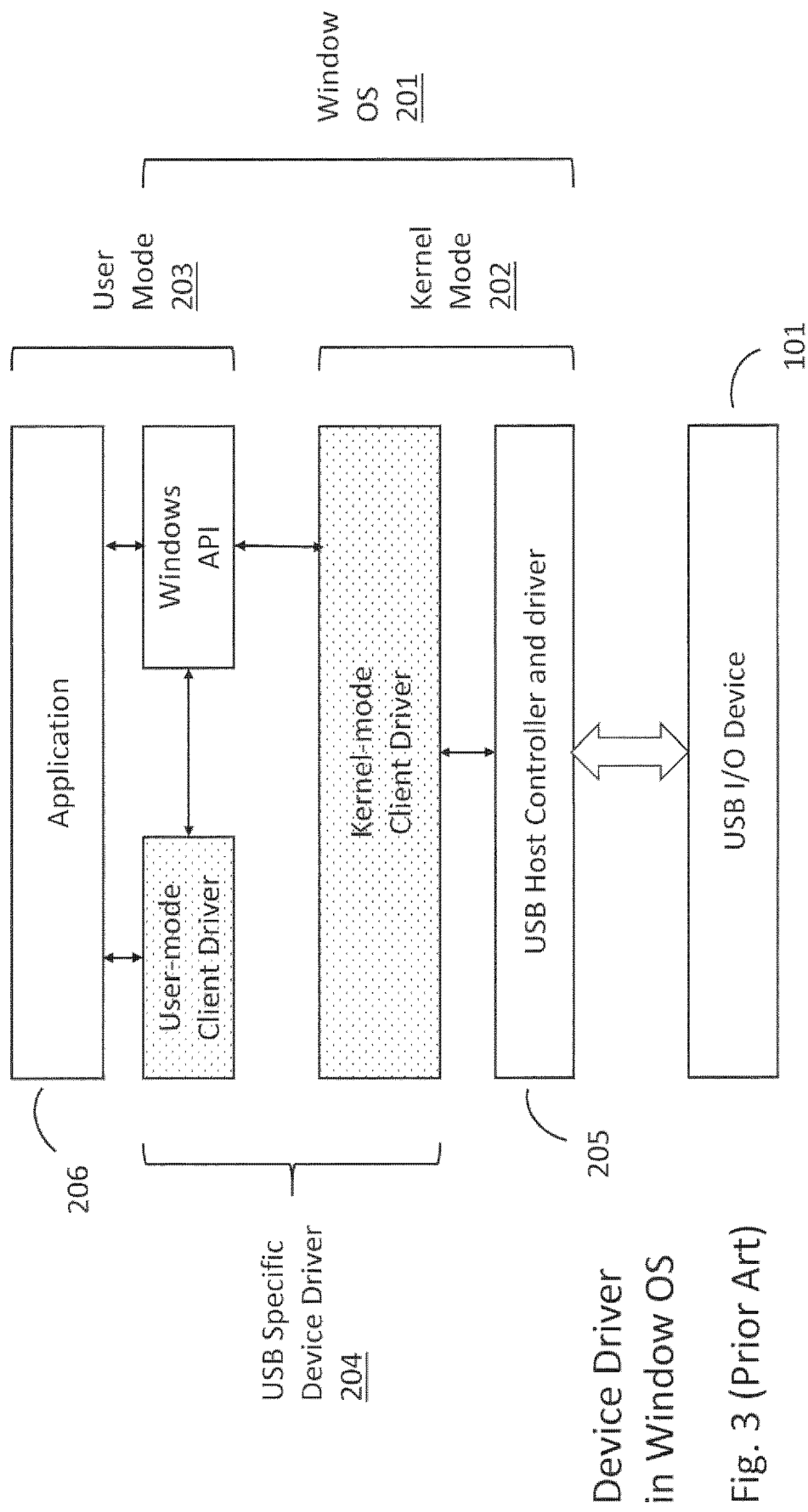
FIG. 3 is block diagram of an operating system (OS) of a conventional system-centric USB I/O configuration.
Figure 4:
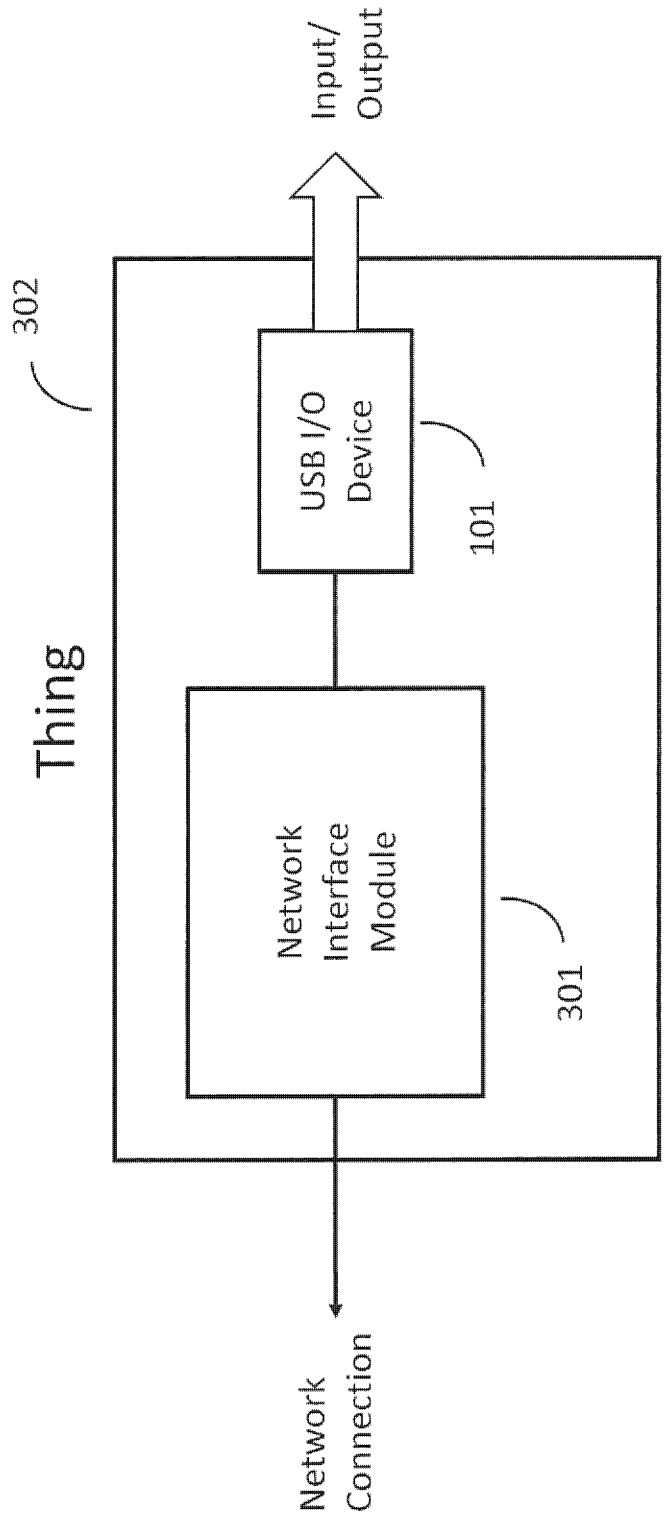
FIG. 4 is a block diagram showing a Network Interface Module that interfaces a USB I/O device to a network to enable the USB I/O device to operate as an IoT device in accordance with one embodiment of the present invention.
Figure 5:
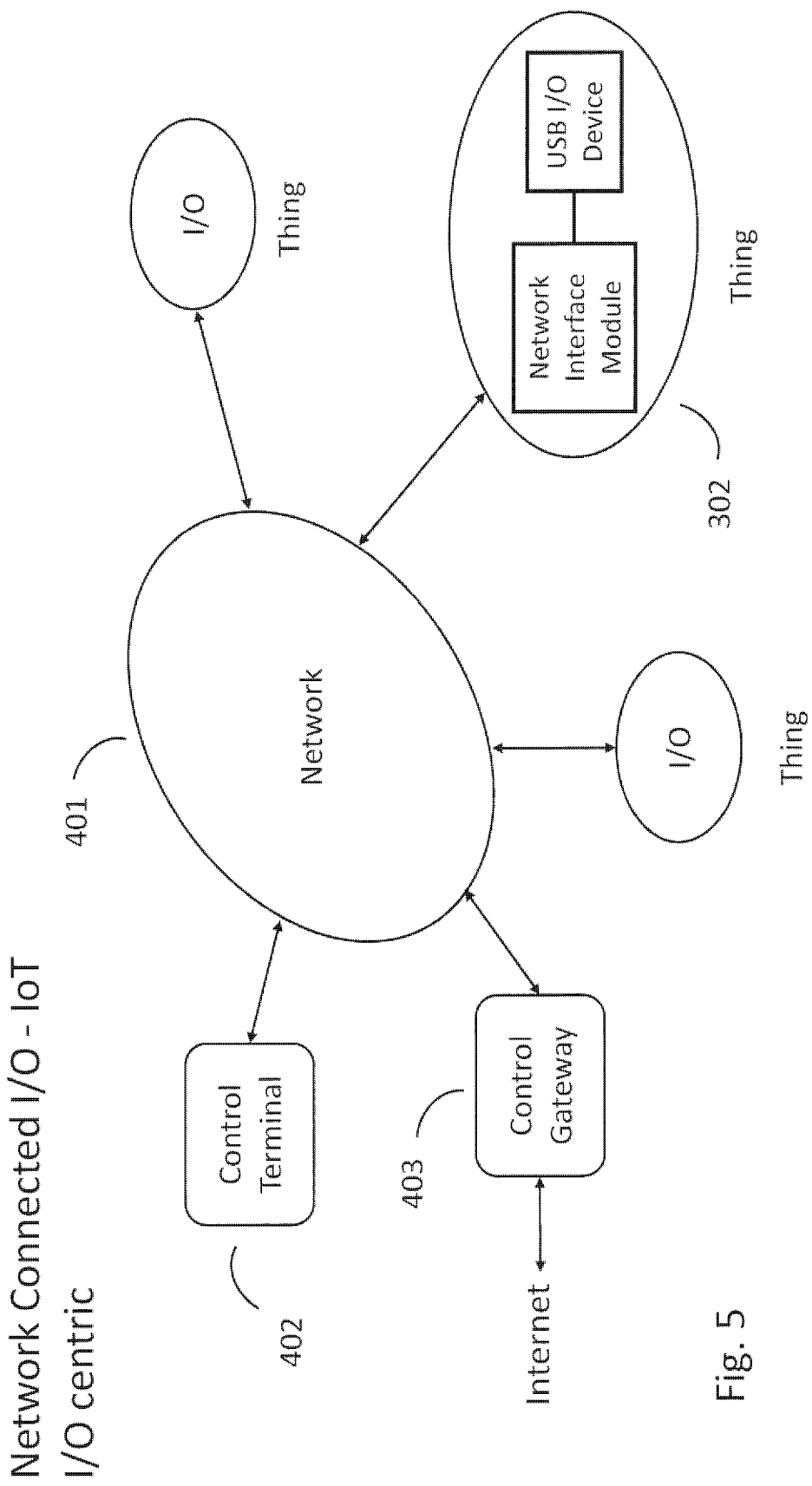
FIG. 5 is a diagram illustrating an Internet of Things (IoT) network of connected input/output devices based on I/O-centric architecture in accordance with the present invention.

The present invention is directed to a system and method to enable a USB I/O device to operate as an IoT device without building specific device drivers for the USB I/O device and without making any modifications to the USB I/O device. Many smart devices use a USB I/O as an interface for data communication, data transfer and receiving DC power supply voltage and current. External devices may control the USB I/O device through the network. Referring to FIGS. 4 and 5, the USB I/O 101 is interfaced to the network via a Network Interface Module 301 so as to enable the USB I/O device to communicate through the network. The combination of the Net Interface Module and the USB I/O device functions as "Thing" 302 which is capable of operating in the Internet of Things (IoT) environment. The details of the Network Interface Module are described in the ensuing description. The Internet of Things (IoT) is defined as a network of connected I/O devices that are able to communicate with each other within the existing network (e.g. Internet) infrastructure. In such a network, the focus is on the connected Thing 302, i.e. the I/O device. Therefore, such a network is based on an I/O-centric platform (see FIG. 5). In this network 401, Things 302 are connected to and distributed over the network. However, Things 302 are not constrained to any main system. Each Thing 302 can be a single I/O device, e.g. an air conditioner, or a combination of a USB I/O device and Network Interface Module 301 (see FIG. 4). Control terminal 402 is a control device such as a remote control console, smart phone or smart speaker. Control gateway 403 enables the network of connected I/Os to connect to the Internet or act as central management unit for locally connected Things 302.

Figure 6:
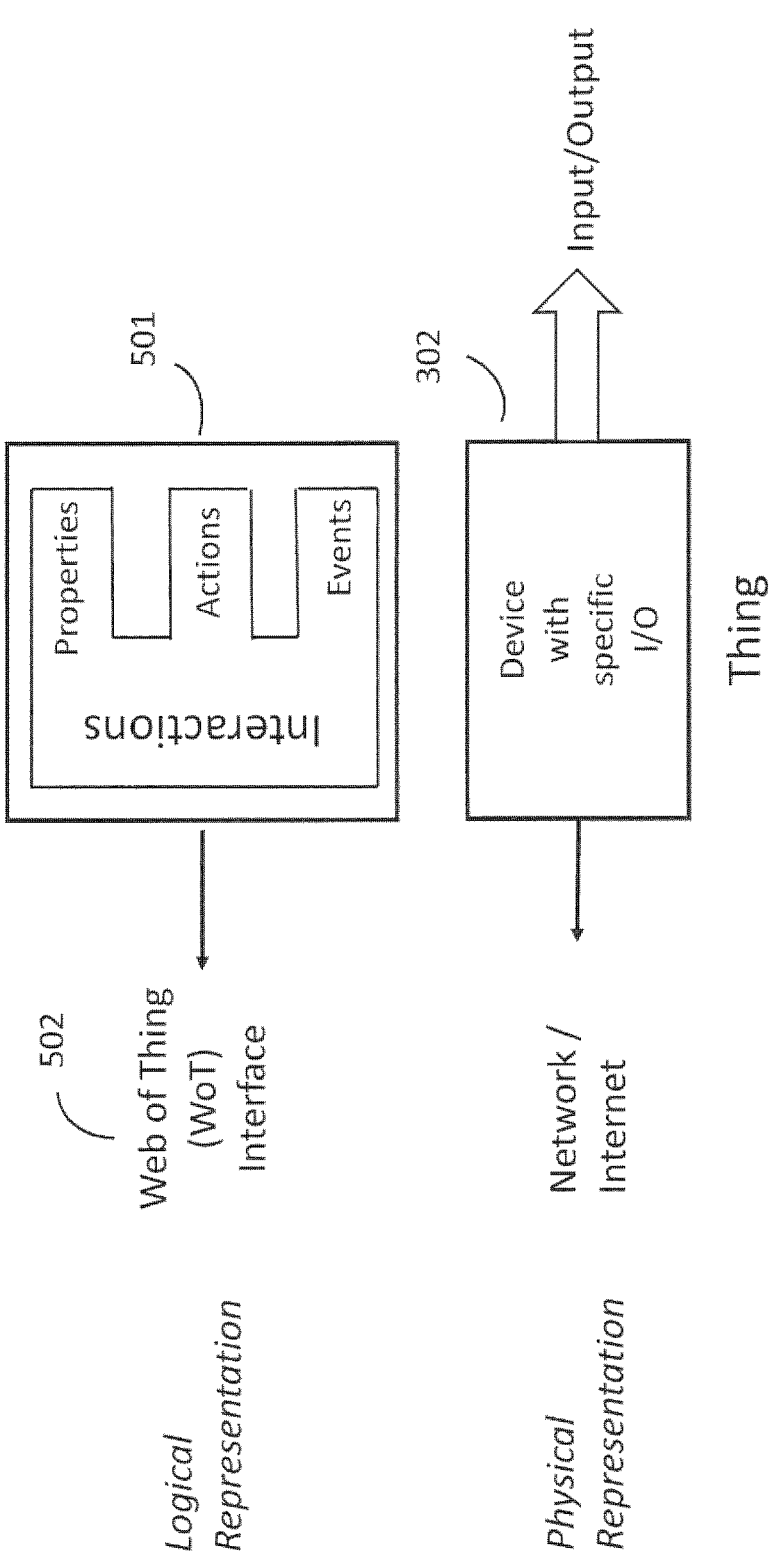
FIG. 6 is a diagram illustrating the Web of Things (WoT) and Thing Description (TD) document used to model a logical or programmatic representation of a physical IoT device.

Referring to FIG. 6, the W3C organization has launched the Web of Things (WoT) architecture to enable data communication across a variety of IoT platforms and application domains. The W3C Thing Description (TD) provides a data model that describes the metadata and interfaces of Things that comprise the entry point of the Thing. FIG. 6 shows the physical representation of the "Thing" 302 as a device having the I/O and network connectivity. The logical representation is shown by Thing Description (TD) model 501 which describes the functioning of Thing 302. Thing 302 has access to the Internet through WoT interface 502. The Thing Description (TD) Document is built around a formal TD Interaction Model having default Interaction Patterns: "Property", "Action" and "Events". These interaction patterns are sufficient to cover the network-facing APIs provided by most IoT platforms. The "Property" interaction pattern provides readable and/or writeable data that can be static or dynamic. The "Action" interaction pattern triggers changes or processes on a Thing that take a certain time to complete (i.e., actions cannot be applied instantaneously like "Property" writes). Usually, ongoing Actions are modelled as Task resources that are created when an Action invocation is received by the Thing. The "Event" interaction pattern enables a mechanism for events to be notified by a Thing on a certain condition. The Thing Description data model can be used to model other types of data patterns or data structures such as voice input patterns, unity UI extensions, etc.

Figure 7:
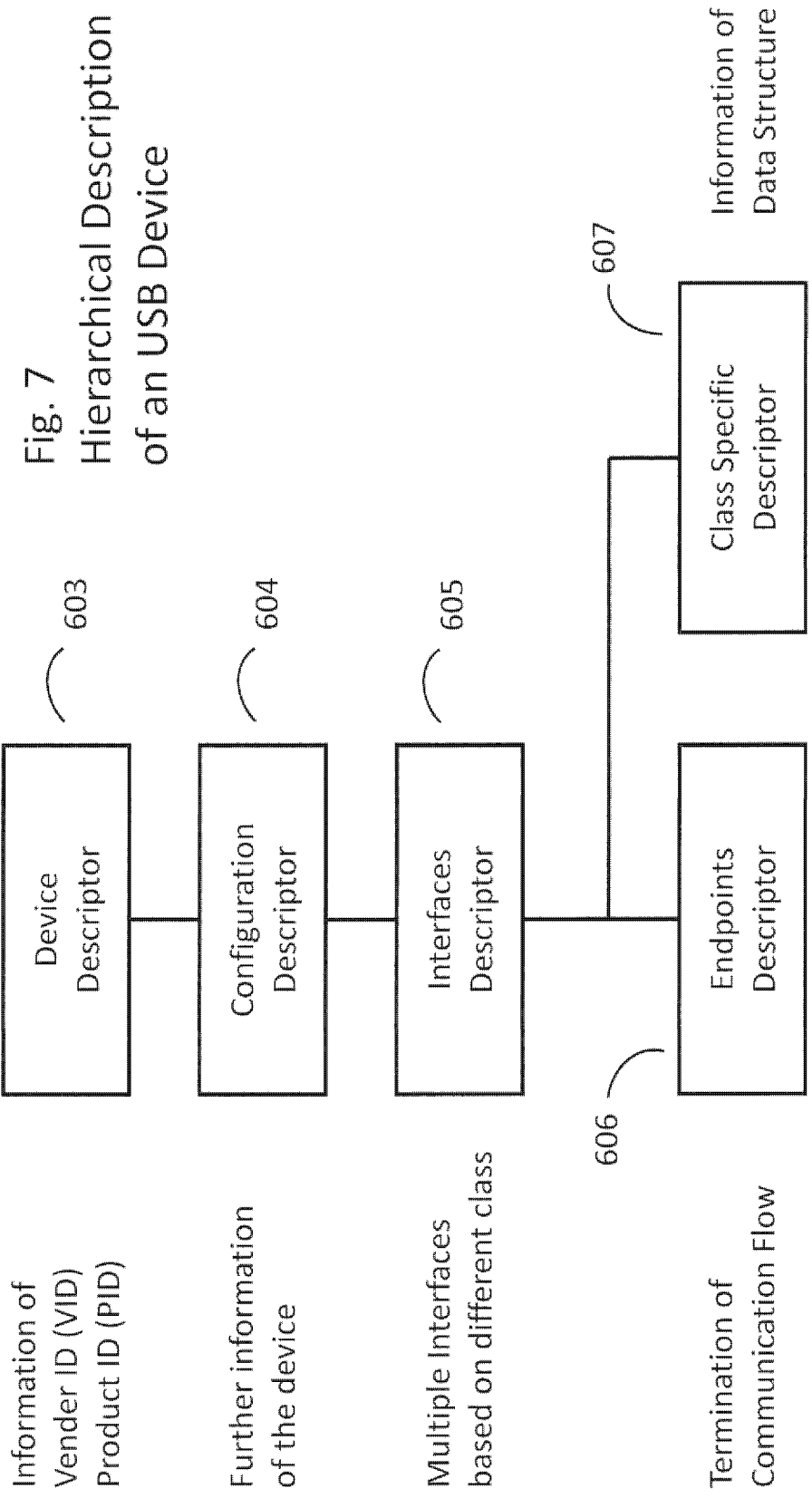
FIG. 7 is a diagram showing the hierarchy of device descriptors that qualify the function, characteristics, interfacing, communication and data format of a specific USB device.

A USB I/O device is configured with a hierarchy of descriptors to qualify the functions, characteristics, interfaces, communication and data format of a specific USB I/O device. FIG. 7 shows a typical hierarchical description model of an USB device. The "Device Descriptor" 603 is at the top of the hierarchy and encompasses information about the USB I/O device such as the Vendor ID (Identification) or "VID" and the Product ID (Identification) or "PID". The "Configuration Descriptor" 604 is next in the hierarchy and describes additional characteristics of the USB I/O device. The Configuration Descriptor contains information such as the number of interfaces and maximum power for that USB I/O device configuration. Next, there are multiple "Interfaces Descriptors" 605 that describe the interface's class and number of endpoints in use. "Endpoint" pertains to the termination of communication flow. The "Endpoints Descriptor" 606 includes the information such as the direction (i.e. In/Out), transfer type, polling interval, synchronization, usage type attribute and maximum packet size for each endpoint. A USB host controller uses this information to construct the communication pipes needed to communicate with that endpoint. "Class Specific Descriptor" is also at the bottom of the hierarchy. The "Class Specific Descriptor" 607 defines additional class-specific information about the data structure used by that specific class of USB I/O devices.

Figure 8:
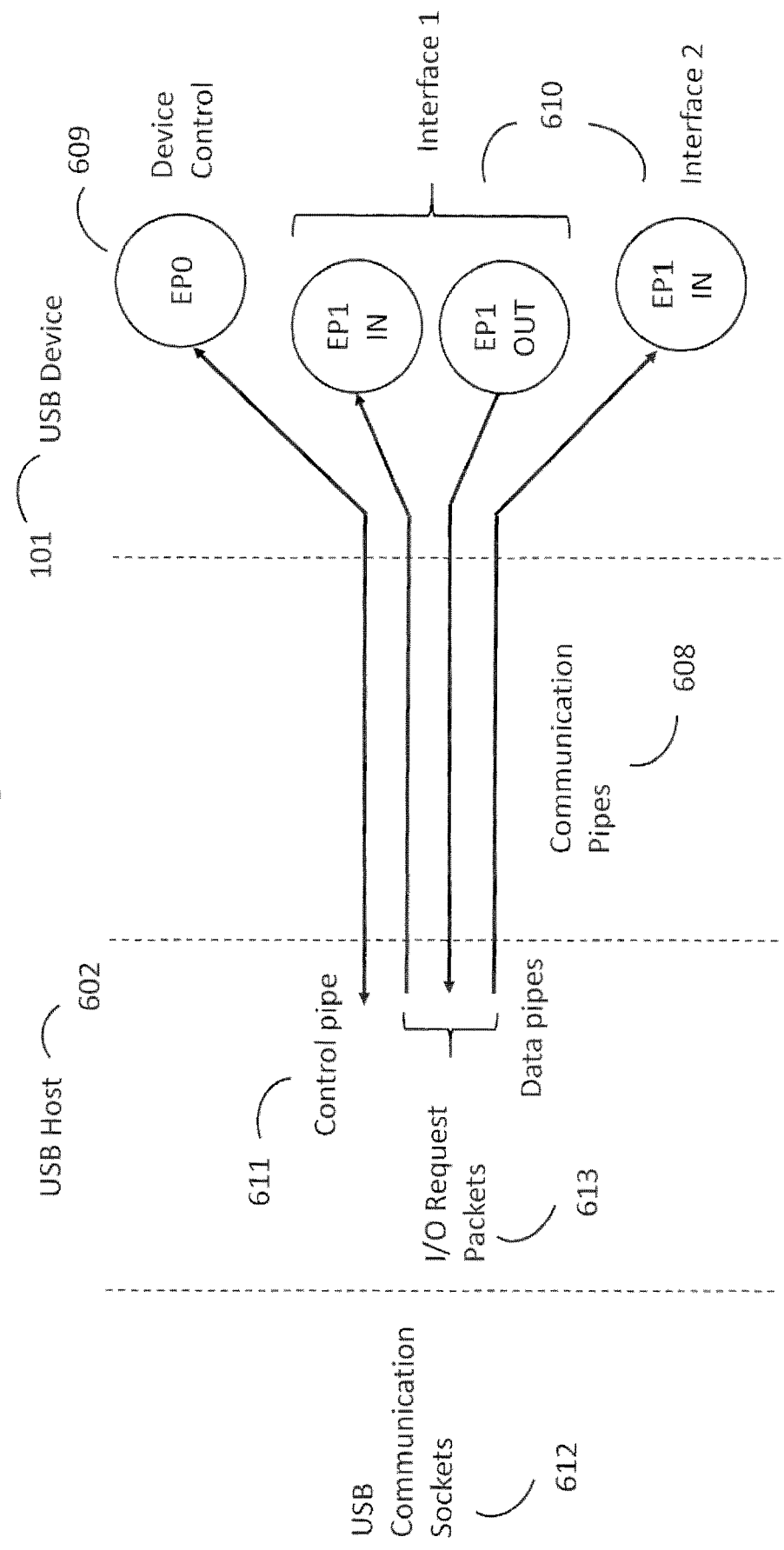
FIG. 8 is a diagram illustrating the USB communication model to show how data is passed from the USB host controller to the USB I/O device.
Figure 9:
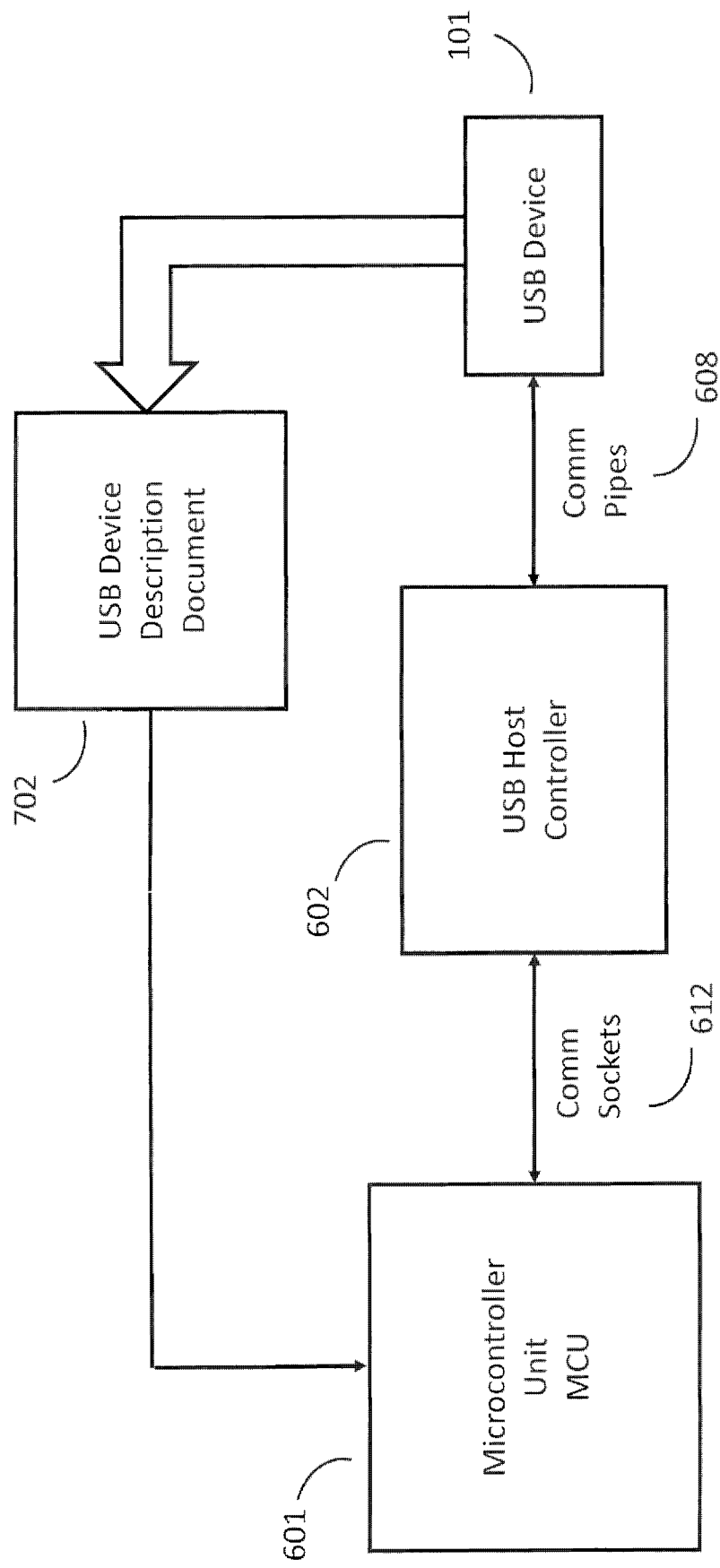
FIG. 9 is a block diagram that illustrates a MCU that parses the USB Description Document to configure the USB host controller for interfacing with the USB I/O device.

Referring to FIG. 8, there is shown the USB communication model. USB host controller 602, now having USB Device Descriptors information, is configured to communicate with the USB I/O device 101 through the logical communication pipes 608 to each existing endpoint EP0, EP1 . . . EPN. Default control pipe 611 accesses endpoint zero 609 of the USB I/O device in order to setup and retrieve the USB configuration information. The USB host controller 602 also establishes other data communication pipes 608 with different endpoints 610 of different interfaces (e.g. Interface 1 and Interface 2) with the associated endpoints attribute from that Endpoints Descriptor 606. The USB communication sockets 612 are software interfaces that allow the upper layer application to drive the data packets 613 to and from the USB device through the USB communication pipes. Thus, as shown in FIG. 9, the interfacing of the USB I/O device 101 via the USB host controller 602 can be fully described with a USB Description Document (UDD) 702. The Microcontroller Unit (MCU) 601 having the UDD is able to establish the communication path and data structure through the communication pipes by the USB host controller 602 to control the USB I/O device 101. In FIG. 9, "Comm Pipes" 608 is an abbreviation for "communication pipes" and "Comm Sockets" 612 is an abbreviation for "communication sockets". The present invention solves the problems associated with the conventional OS-centric platforms that use USB device drivers by utilizing an I/O-centric platform that is independent of the operating system (OS) and utilizes the USB Description Document (UDD) 702 to construct the USB accessing mechanism that allows a USB I/O device to interface with and operate under the interfacing hardware.

Figure 10:
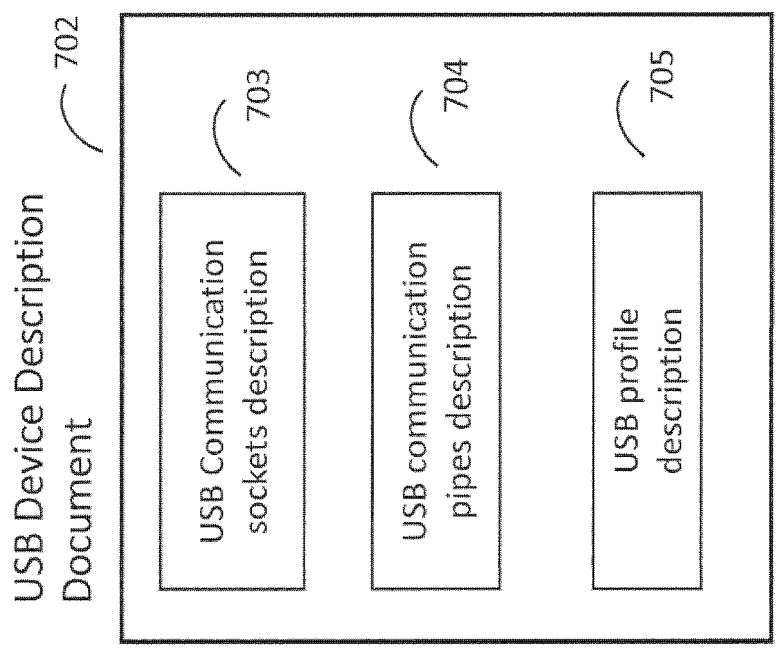
FIG. 10 illustrates the USB Device Description Model that is used to enable the hardware logic to understand and implement the corresponding communication process and data structure to drive a USB I/O device operation.

Referring to FIG. 10, there is the detail block diagram of the USB Device Description Model, the UDD 702. The model builds on the similar concept as the Thing Description to use the JSON-LD to describe the construction, interface and data structure of the USB I/O device. Basically, the UDD 702 is composed of three abstraction layers: USB Communication Sockets 703, USB Communication Pipes 704 and USB Device Profile 705. The USB Device Profile 705 has the basic USB device information that is equivalent to the content of the USB device descriptors retrieved through the control pipe with the endpoint zero in the USB enumeration process. The USB Device Profile 705 includes the information of the USB I/O device such as:

a) Device Class, Subclass, Protocol;
b) Vender ID, Product ID, Release;
c) Manufacturer name, Model, Serial number; and
d) Maximum Power Rating.

The USB Device Profile 705 also includes details of the endpoints including endpoint number, direction, packet size, transfer attributes of transfer type, synchronization type and usage type, and other information defined in the USB-IF.

The USB communication pipes description 704 defines the abstract information on the setup of the USB host controller to communicate with the endpoints of the specific USB device. The MCU 601 of the interfacing board will initialize the host controller and establish the corresponding buffers for data transfer between the host controller and specific USB device in a specific type of transaction (stream or message pipes). Furthermore, there is information about the specific data information on the data buffer for that endpoint as defined by the USB device. This information is from the class-specific data pattern that is unique to that device I/O function. For example, a lighting control box with a multiple-zone control unit can be defined with 16-bit data and each data-bit corresponds to a zone. Hence the data type for this data is a non-standard type in JSON definition, such as data in bits, bytes or BCD (Binary Coded Decimal) types which are normal in hardware implementation. All these data types are defined in the USB I/O schema to support the UDD. Furthermore, there is also the declaration of the specific data structure that is used by the specific USB device. This communication pipe description information is further used by the upper layer communication sockets for the data conversion and transfer.

Figure 11:
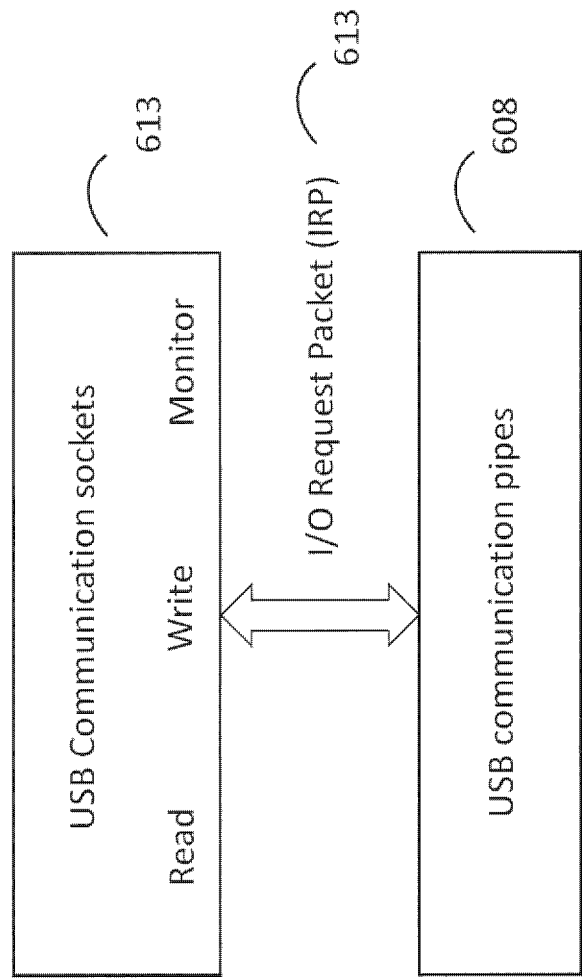
FIG. 11 is the block diagram relating the USB Communication sockets and the Communication pipes.

The USB Communication Sockets 612 are used to interface between the upper layer application and the lower layer USB host controller data transfer which is represented by USB communication pipes 608. As shown in the FIG. 11, the USB communication sockets generate the I/O Request Packet (IRP) 613 for data transfer with the USB device through the USB communication pipes 608. In general, there are "read", "write" and "monitor" functions in the communication sockets that are used to read data from the IN pipes and write data to the OUT pipes. The read/write functions also perform the data extraction and conversion in between the raw data of the IN/OUT pipes and the high level data type used in the USB description document. The monitor function is a special function that is unique to USB operation since the USB architecture is a host-based controlled I/O bus. The host controller is responsible for all of the I/O activities and the device only sends data to the host on request. All operations are initiated by the USB host controller and the USB device just responds with the update status of the I/O on request through the communication pipes. The monitor operation specifies which status information is checked and also the refresh rate is declared so that the MCU is able to initiate the read operation to check out the update data regularly through the host controller via the communication pipes. Whenever there is a change, the monitor operation will provide feedback accordingly. The monitor function will operate in the background when it is initiated.

Figure 12:
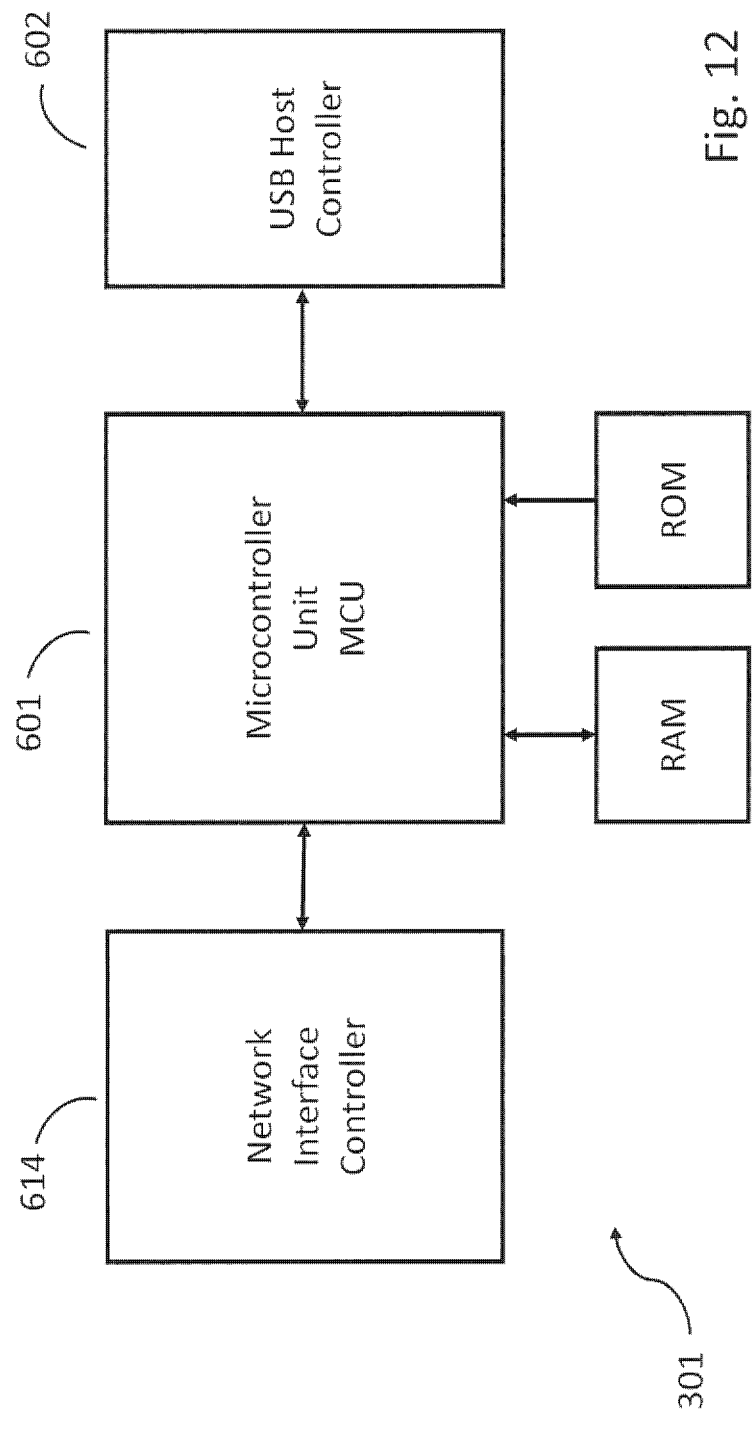
FIG. 12 is a block diagram of a general hardware configuration of Network Interface Module in accordance with one embodiment of the present invention.
Figure 13:
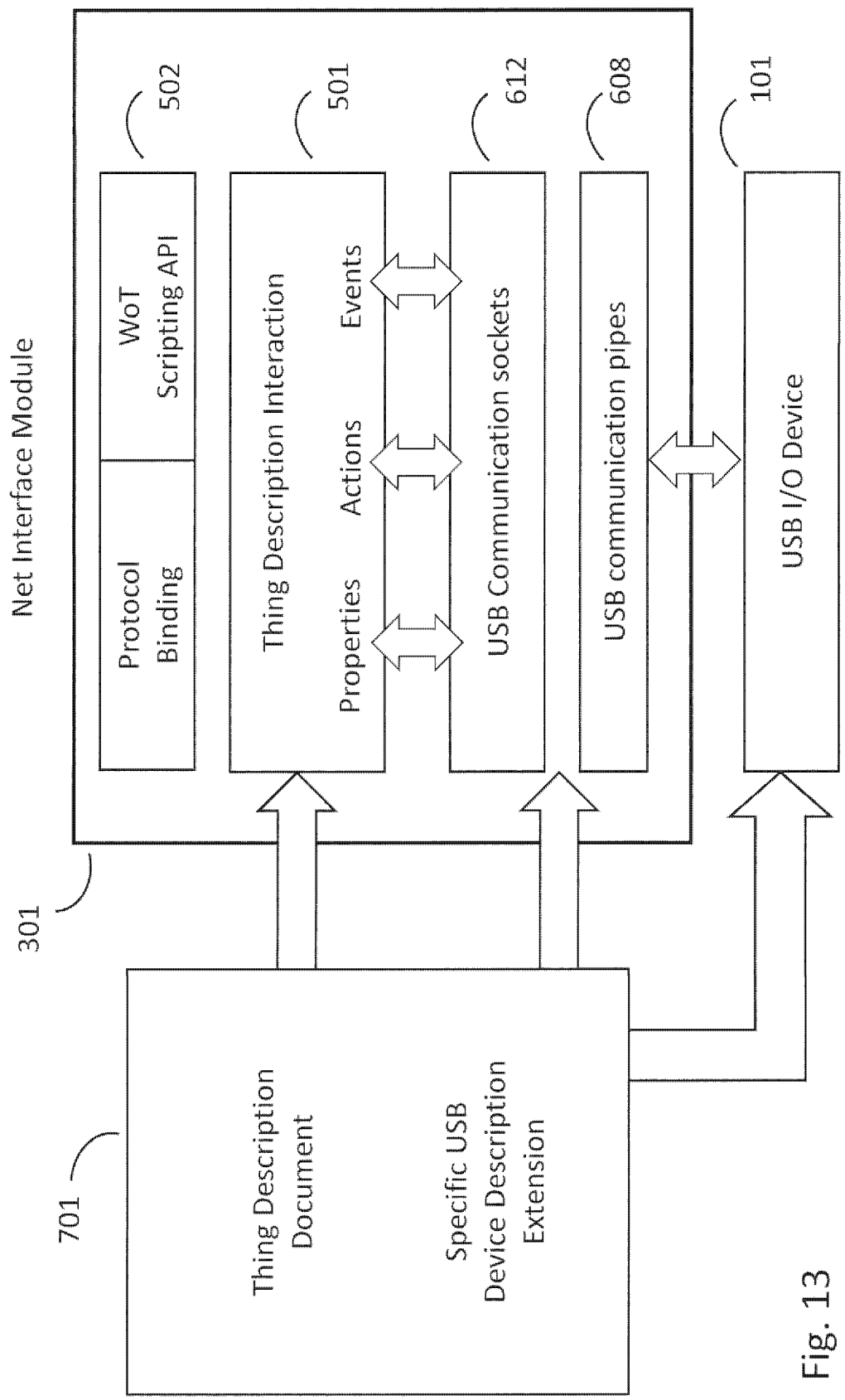
FIG. 13 is a block diagram illustrating the correlation of the software abstract layer structure and the received Thing Description (TD) document with specific USB I/O Device Description Extension that was acquired from a central repository and the construction of the corresponding WoT data architecture needed to transform the combined Network Interface Module and USB I/O device into an IoT device.

Referring to FIGS. 12 and 13, there are shown exemplary hardware block diagrams of Network Interface Module (NIM) 301 which are based on the USB operation model described in the foregoing description. As shown in FIG. 12, the Network Interface Module (NIM) 301 comprises Microcontroller Unit (MCU) 601 and a RAM and ROM. NIM 301 includes Network Interface Controller 614 which is typically an Ethernet or WiFi connection that allows connectivity to the LAN or Internet. USB Host Controller 602 enables NIM 301 to connect to an external USB I/O device. Referring to FIG. 13, NIM 301 includes a USB interface (e.g. USB signal port) for receiving USB I/O device 101. NIM 301 includes logic and firmware that realizes WoT interfacing architecture shown as WoT Protocol Binding and Scripting API 502. NIM 301 utilizes Thing Description (TD) Document 701 and "Thing Description Interaction" logic 501 to model the USB I/O device 101 function. Thing Description (TD) Document 701 is based on the WoT architecture model. WoT Protocol Binding and Scripting API 502 are the interfacing architecture that enables the Thing (i.e. USB I/O device 101) to operate in the WoT environment and communicate with other IoT devices. Protocol Binding is an implementation of the mapping between interaction in the Thing Description Interaction model 501 and specific operations through the protocol (e.g. HTTP, MQTT or CoAP). Scripting API 502 is the application-facing programming interface provided by a Servient as described in W3C (World Wide Web Consortium) documentation. Inclusion of the corresponding USB Device Description Extension allows NIM 301 to understand the function and interface of USB I/O device 101 and also allows NIM 301 to build the corresponding USB Communication Sockets 612 that match the Properties, Actions and Events interaction patterns of Thing Description Interaction 501. The communication sockets 612 have the Read/Write/Monitor command so that the TD Property/Action/Event interaction request can be fully served. The "Monitor" socket interface is specially devised to handle the "Event" interaction.

Figure 14:
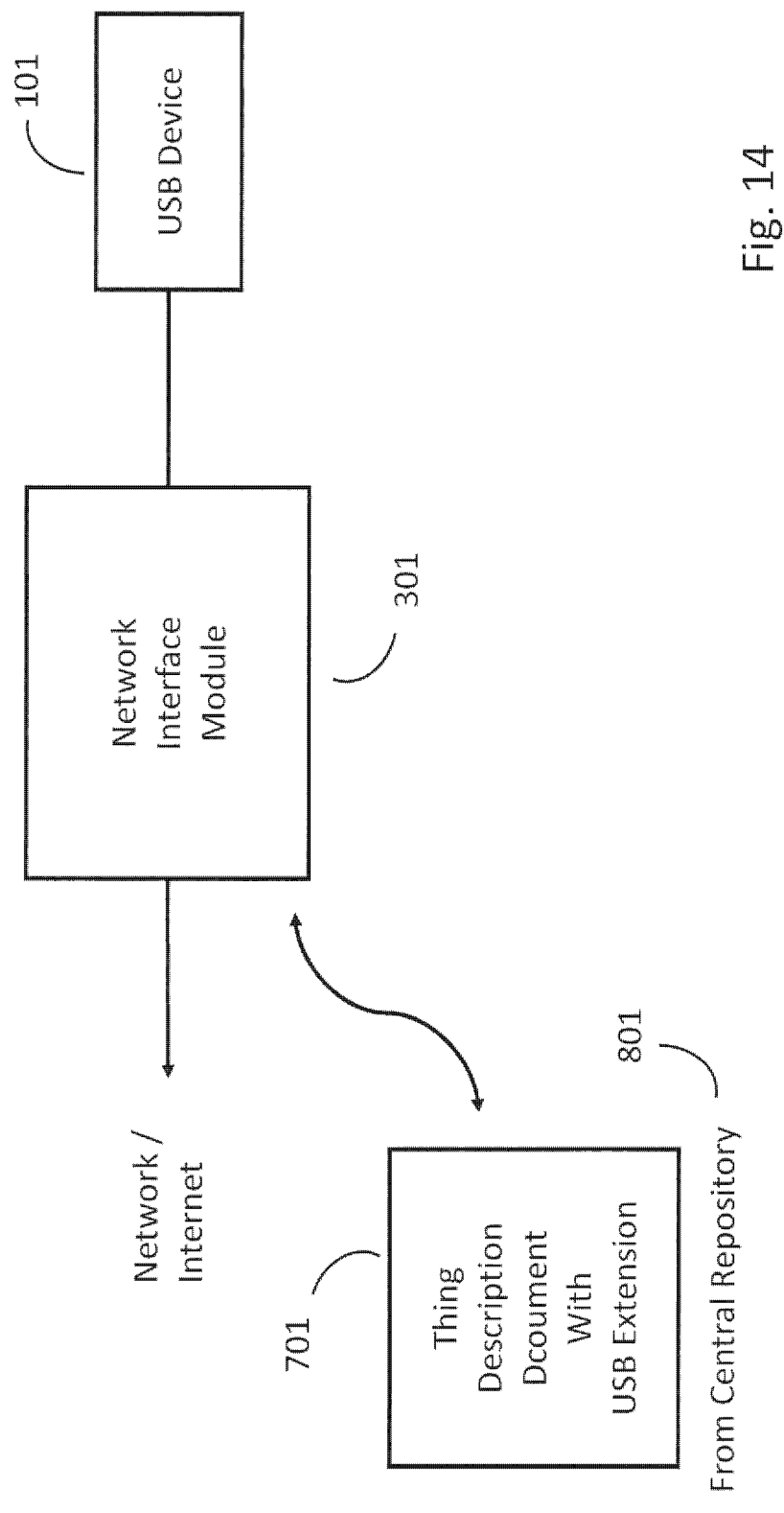
FIG. 14 is a block diagram that illustrates the conversion of a USB I/O device into a USB IoT device, wherein the Thing Description (TD) document with specific USB extension is acquired from the central repository and used to configure the logic of the Network Interface Module to enable the USB I/O device to interface with the network as an IoT device.

Referring to FIG. 14, there is shown a block diagram of an exemplary embodiment of the present invention. Central repository 801 is in data communication with the network (e.g. Internet) and stores a plurality of Thing Description (TD) documents with USB Extensions 701 that correspond to different USB I/O devices. The USB device 101 is electronically connected to a USB signal port (not shown) of NIM 301. NIM 301 is in data communication with a network such as the Internet. In this example, the USB I/O device is initially not interfaced to the network and therefore cannot operate on the network as an IoT device. However, it is desired to effect data communication between the USB device 101 and the network so that the USB I/O device can operate as an IoT device and participate in the WoT. In order to enable the USB I/O device 101 to function as IoT device, NIM 301 uses the network to acquire the appropriate WoT Thing Description (TD) document with USB extension from central repository 801. The acquired WoT Thing Description (TD) document corresponds to the specific USB I/O device that is electronically connected to USB signal port of NIM 301. NIM 301 includes digital logic circuitry and firmware that parses the Thing Description (TD) and constructs WoT data model that enables communication between the USB I/O device 101 through the NIM 301 to the network. USB I/O device 101 can now interface with the network as IoT device and participate in the WoT without any modifications being made to the USB I/O device 101.

Figure 15:
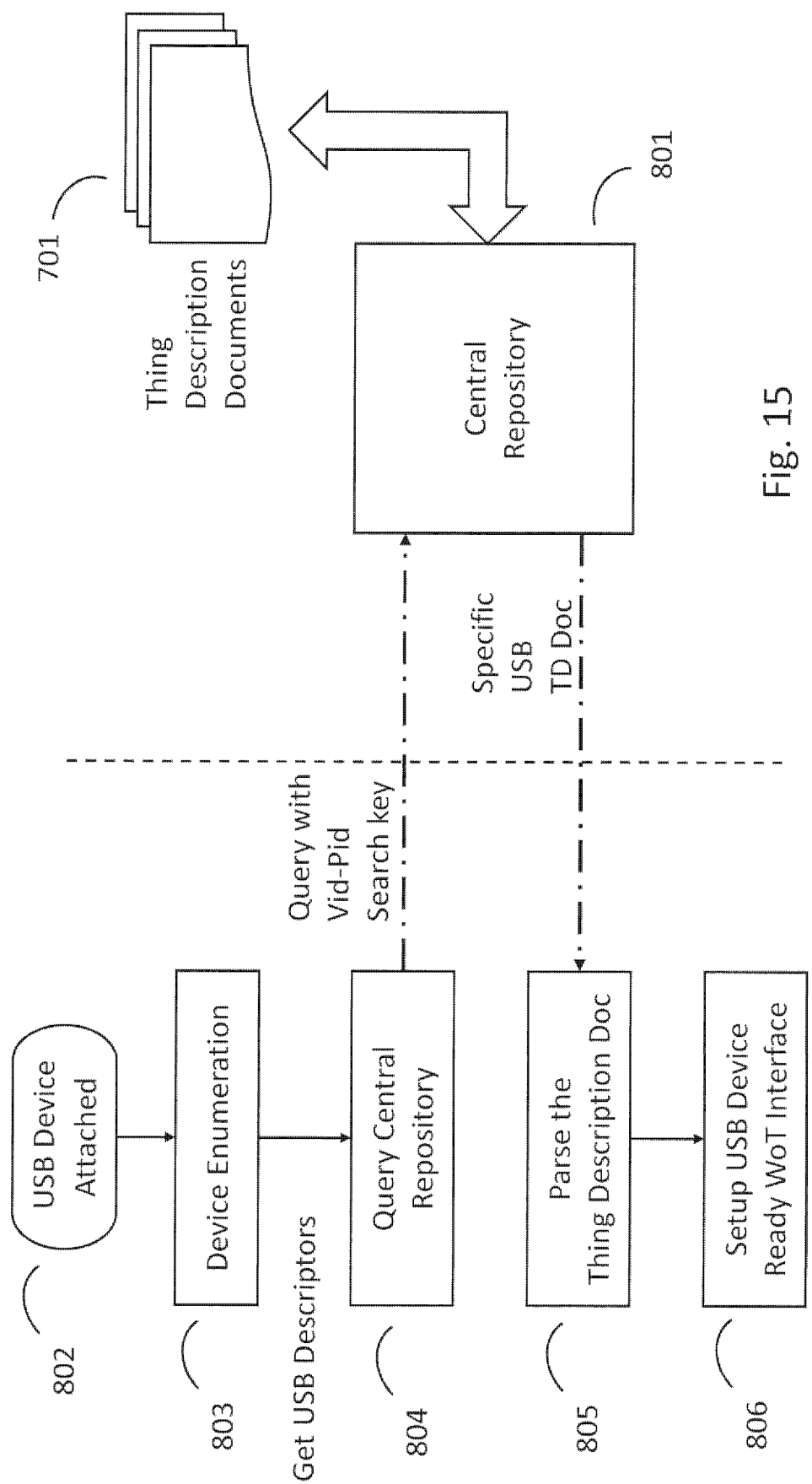
FIG. 15 is a flow diagram illustrating the method for executing a Thing Description (TD) document feed to a Network Interface Module in order to convert a USB I/O device to an IoT device that is capable of data communication with a network such as the Internet.

Referring to FIG. 15, there is shown a diagram of the process steps implemented by Network Interface Module (NIM) 301 that result in USB I/O device 101 being enabled to operate as IoT device in the WoT environment. NIM 301 is in data communication with the network (e.g. Internet). In the first step 802, the USB I/O device 101 is connected or plugged into a USB signal port of NIM 301. Next, in step 803, NIM 301 implements the USB device enumeration process and acquires the unique Vendor ID (VID) and Product ID (PID) of the USB I/O device 101 that are stored in Device Descriptors 603 (see FIG. 7). In the next step 804, the NIM 301 uses the unique Vendor ID and Product ID of the USB I/O device 101 as keys to access, query and search central repository 801 through the web service for the appropriate Thing Description (TD) Documents 701. Once the appropriate Thing Description (TD) Document is identified, the NIM 301 gets the identified Thing Description (TD) Documents from central repository 801. The downloaded Thing Description (TD) Document includes the specific USB extension corresponding to the I/O of the USB I/O device plugged into the USB signal port of NIM 301. In step 805, MCU 601 (see FIG. 12) of NIM 301 parses the Thing Description (TD) document. The Things Description (TD) Document is constructed to include the specific USB I/O device description extension. NIM 301 uses the parsed Thing Description (TD) Document to construct the communication pipes 608 and communication sockets 612 that enable data communication between the I/O of the USB I/O device and USB host controller 602 (see FIG. 11) such that the I/O of the USB I/O device now matches the "Property", "Action" and "Event" interaction patterns described in the foregoing description. The USB host controller 602 is now able to interpret the data from the USB I/O device 101 and route such interpreted data to the microcontroller unit (MCU) 601. MCU 601 then interfaces Network Interface Controller 614 so that USB I/O device 101 is able to interface with the network as an IoT device. As evident by the foregoing description, device drivers are not required in order to enable USB I/O device 101 to interface with the network as an IoT device. The NIM 301 hardware and firmware accomplish the task by parsing the TD document 701 and configuring the interface call function accordingly.

Figure 16:
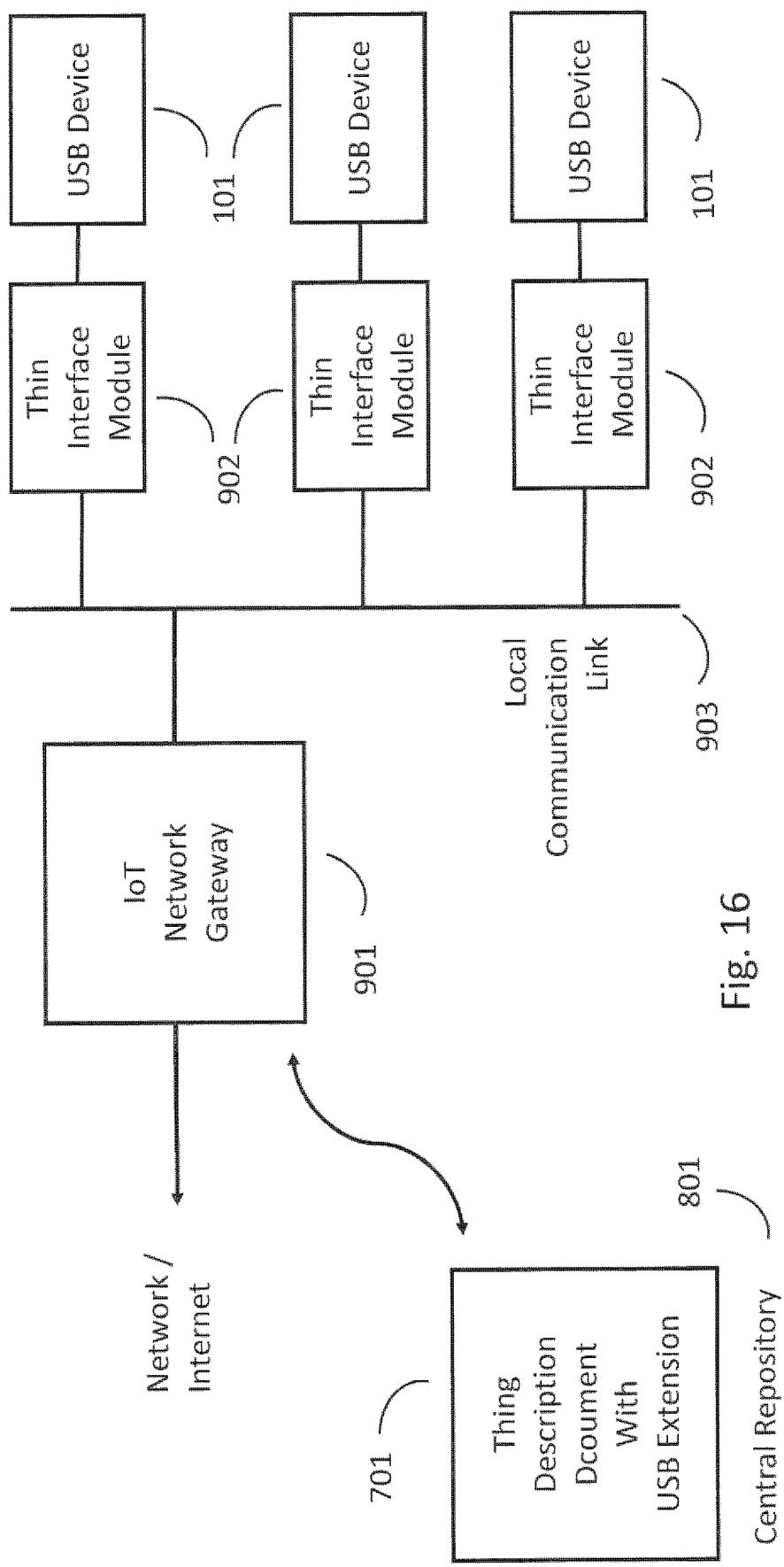
FIG. 16 is a block diagram that illustrates another embodiment of the invention that utilizes a Network Gateway and cluster of Thin Interface Modules in place of the Network Interface Module shown in FIG. 4.

Referring to FIG. 16, there is shown another exemplary embodiment of the present invention. In this embodiment, an IoT Network Gateway 901 is used in combination with plurality of Thin Interface Modules 902 to realize the same functionality as the Network Interface Module (NIM) 301 shown in FIG. 14. Thus, in this embodiment, the Network Interface Module (NIM) 301 is replaced by the IoT Network Gateway 901 and Thin Interface Modules 902. Each Thin Interface Modules 902 is in data communication with the IoT Network Gateway 901 via a local communication link 903 to form a more cost effective distributed IoT environment. IoT Network Gateway 901 includes digital logic circuitry and at least one data processing resource configured with firmware that incorporates the USB data transfer communication protocol corresponding to local communication network 903. This USB data transfer protocol facilitates reliable and distributed USB communication pipes for transferring USB data over local communication network 903 to the IoT Network Gateway 901 or receive USB data over local communication network 903 from the IoT Network Gateway 901. Each Thin Interface Module 902 comprises digital logic circuits including a microcontroller unit (MCU), random access memory (RAM), read-only-memory (ROM), flash memory, a USB Host controller and a network interface controller that is similar to the NIM. The network interface controller establishes data signal communication with the IoT Network Gateway 901 using local communication network 903. The hardware resources of each Thin Interface Module 902 are configured for minimal requirement in order to optimize the cost as it only performs minimal communication function between the local communication network 903 and the USB I/O device 101. Thus, a localized IoT Network can be realized by the combination of the plurality of USB I/O devices 101, the Thin Interface Modules 902, local communication network 903 and the IoT Network Gateway 901. Each Thin Interface Module 902 is in data signal communication with a corresponding USB I/O device 101 and acquires the unique Vendor ID and Product ID of that corresponding USB I/O device 101 via an enumeration process. Each Thin Interface Module 902 routes the unique Vendor ID and Product ID to the IoT Network Gateway. The Vendor ID and Product ID are used as query keys to access and search the central repository 801 for the Thing Description (TD) Documents that correspond to the USB I/O device in operation. Once the appropriate Thing Description (TD) Document is located in the central repository 801, it is downloaded to the IoT Network Gateway for further processing. Next, the IoT Network Gateway 901 parses the Thing Description (TD) Document and constructs WoT interface architecture on the gateway. The corresponding USB communication sockets are included in the gateway while the USB communication pipes information is passed to Thin Interface Modules to setup the USB host controller to establish the communication pipes between the Thin Interface Module 902 and a corresponding USB I/O device 101. Thus, each USB I/O device 101 is configured and network-connected via the corresponding Thin Interface Module 902 and IoT Network Gateway 901 thereby accomplishing the same full function of the Network Interface Module 301. The advantage of this configuration is that the Thin Interface Module 902 requires minimal hardware resources to interface the USB I/O device 101 such that the total cost to have multiple IoT devices can be optimized. Furthermore, the centralized IoT Network Gateway 901 responsible for most of the key roles in the WoT architecture can be allocated and optimized, such as the machine-to-machine communication (M2M) operation. The configuration provides cost optimization, a distributed I/O nature and central management effectiveness.

However, it is to be understood that in other embodiments, the network interface controller of each Thin Interface Module 902 can be configured to interface with any one of a variety of different types of local communication networks or links 903 such as powerline communication networks or wireless networks such as 5G, Zigbee, Lora, Bluetooth mesh and etc.

Figure 17:
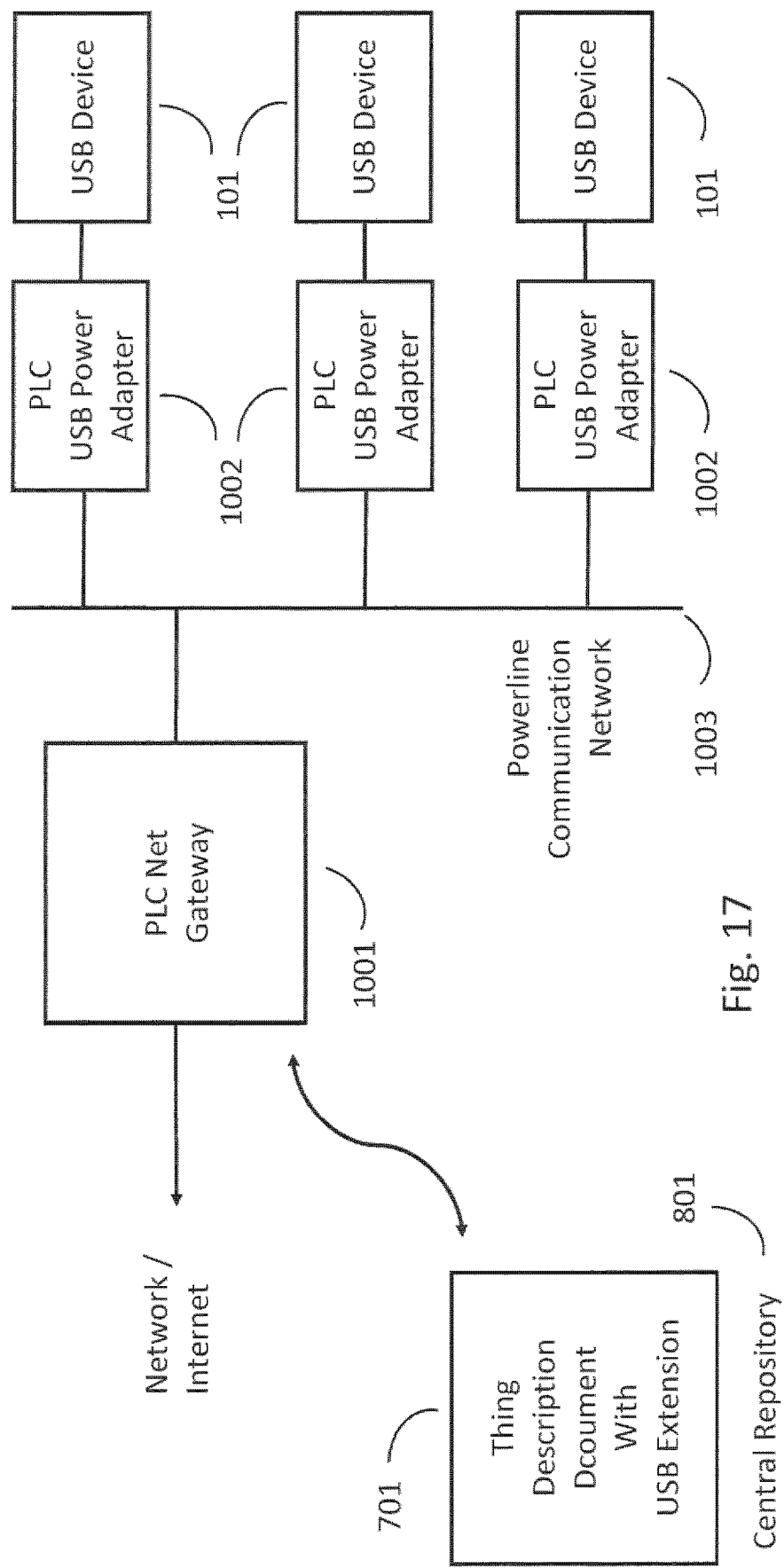
FIG. 17 is a block diagram that illustrates another exemplary embodiment of the present invention which is based on the embodiment shown in FIG. 16 and which utilizes a powerline communication (PLC) network and wherein the Thin Interface Modules and Network Gateway shown in FIG. 4 are realized by PLC USB Power Adapters and a PLC Network Gateway, respectively.

Referring to FIG. 17, there is shown an exemplary embodiment wherein the local communication link is based on powerline network 1003. In this embodiment, each Thin Interface Module is represented by a PLC (Powerline Communication) USB Power Adapter which provides both data and power to the USB I/O devices 101. All data is routed to the PLC Network Gateway 1001 which is equivalent to Network Gateway 901 shown in FIG. 16. PLC Network Gateways are further described in commonly owned U.S. application No. 62/564,234, the disclosure of which application is hereby incorporated herein by reference.

Figure 18:
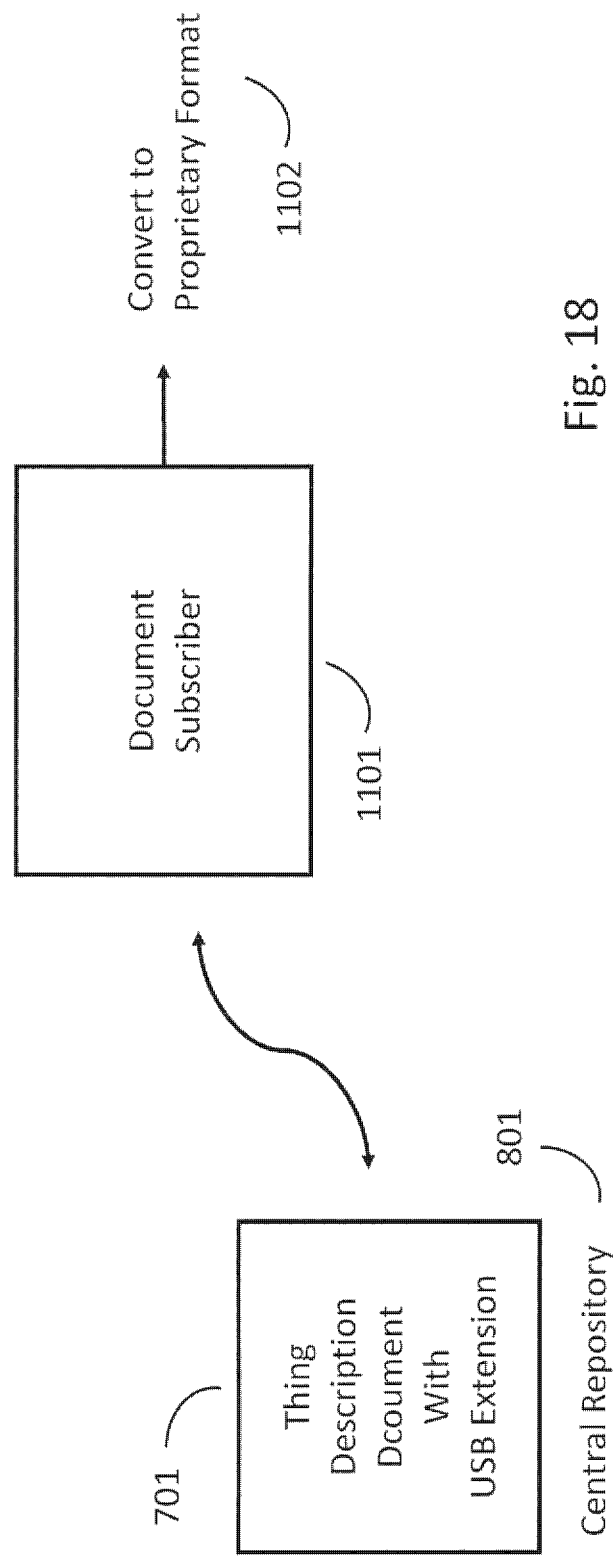
FIG. 18 is a diagram that illustrates a further embodiment of the invention wherein a Document Subscriber interfaces with the network for the purpose of acquiring Thing Description (TD) documents with USB extension from the central repository and then converting the acquired Thing Description (TD) documents to another application format that is used for local deployment.

Referring to FIG. 18, there is shown another embodiment of the invention wherein a document subscriber 1101 is authorized to access, query and search Thing Description (TD) Documents with USB extensions 701 in central repository 801 and then convert the Thing Description (TD) Documents to another format that is specifically required by document subscriber 1101 for a particular application, such as a proprietary Network Interface Module application. In one embodiment, document subscriber 1101 comprises a remote document subscriber interface module that is in data signal communication with the network and includes a processor and digital logic circuitry for receiving and storing vendor and product identifications for at least one USB I/O device. The processor includes firmware that, when executed, utilizes the vendor and product identifications to query the database of the central repository 801 for a Thing Description (TD) document with specific USB extension that corresponds to the vendor and product identifications and retrieve the Thing Description (TD) documents with USB extension that correspond to the vendor and product identifications. In an exemplary embodiment, the network is the Internet and the remote document subscriber interface module is configured to interact with a web service to enable data communication over the Internet between the central repository 801 and the remote document subscriber interface. In another exemplary embodiment, the network is a personal area network. In one embodiment, the remote document subscriber interface module includes data output logic to route the Thing Description (TD) documents to at least one external processing resource.

In a preferred embodiment, the central repository 801 stores a single TD document for each specific USB product. This will ensure that USB I/O device manufacturers only have to create the TD document just once and that the TD document can be used by any IoT platform implementation. The IoT platform implementation would need only to parse the TD document and configure the WoT logic accordingly so as to allow the USB I/O device to communicate on a network as an IoT device.

As apparent from the foregoing description, the present invention provides many advantages, including:
 a) eliminates the need to develop any OS-dependent device drivers because the Network Interface Module handles the I/O configuration;
 b) construction of a single Thing Description (TD) Document for each particular USB I/O device that fits all IoT platforms;
 c) construction of a single Thing Description (TD) Document occurs only once and then is stored in the central repository where it can be accessed perpetually;
 d) optimization of the Network Interface Module because it only has to operate with the particular USB I/O device on demand;
 e) Network Gateway can be used in combination with a Thin Interface Module to query and access Thing Description (TD) Documents from the central repository thereby further optimizing the total cost of ownership of a distributed IoT operation;
 f) Plug & Play operation through the internet download of the Thing Description (TD) Document via the Network Interface Module or IoT Network Gateway when USB I/O device is attached; and
 g) Greatly enriches the development of new USB I/O varieties and product launching as there is no longer any restriction of the device driver or class driver in the OS.

Referring to FIGS. 19-22, there is illustrated an example of an implementation of a USB I/O device starting from function definition, the Thing's interaction patterns, USB model and the corresponding TD document. In this example, the USB I/O device is a USB Aquarium Control Center. The control center 1201 includes a USB interface that supplies the power and data for the control center 1201. The control center 1201 performs three functions:
 a) pump air into the aquarium using air-pump 1202;
 b) control the water temperature using thermal control and heater 1203; and
 c) dispense food into the aquarium upon command using food dispenser 1204.

Figure 19:
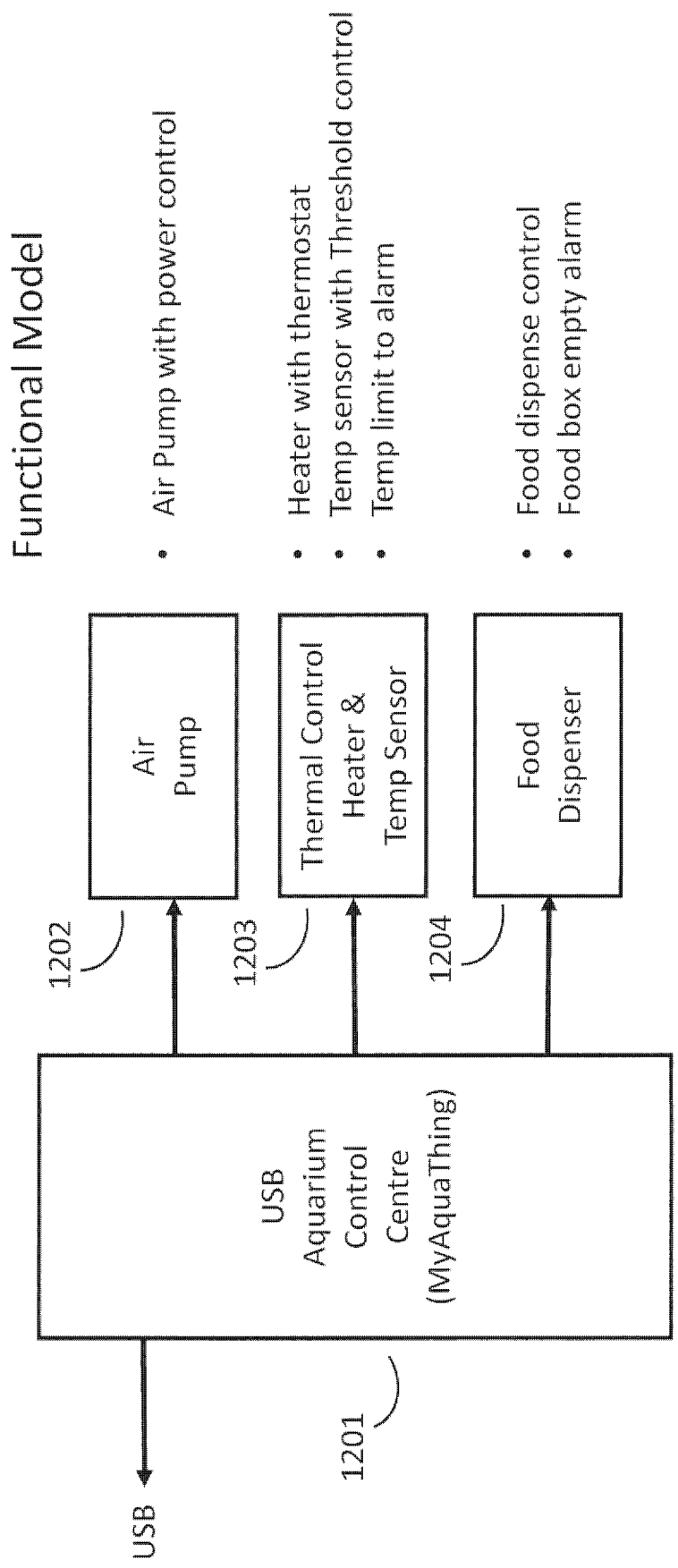
FIG. 19 is a block diagram of a USB Aquarium Control Center that utilizes the present invention.
Figure 21:
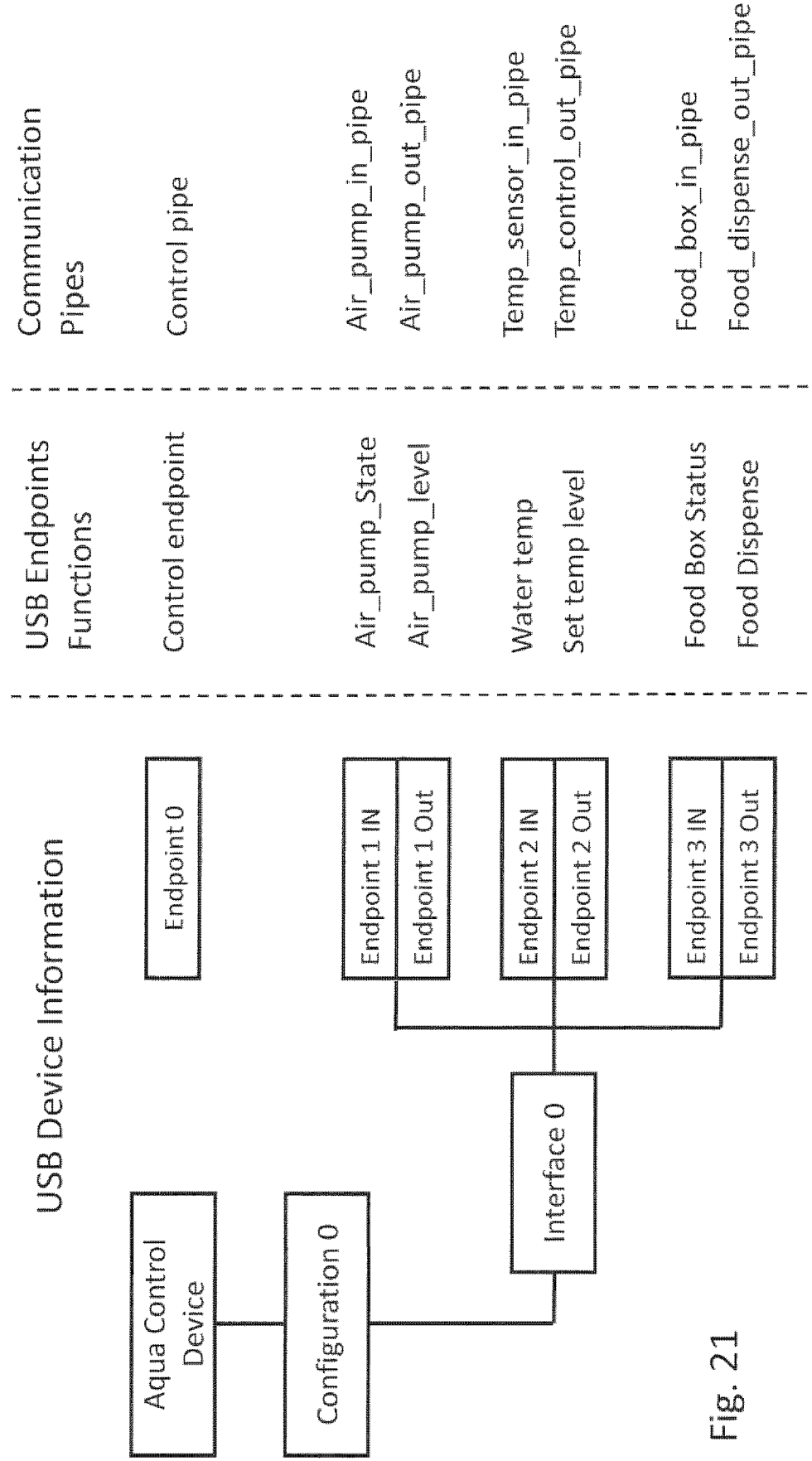
FIG. 21 illustrates the USB endpoints correspondence for the USB Aquarium Control Center shown in FIG. 19.
Figure 22:
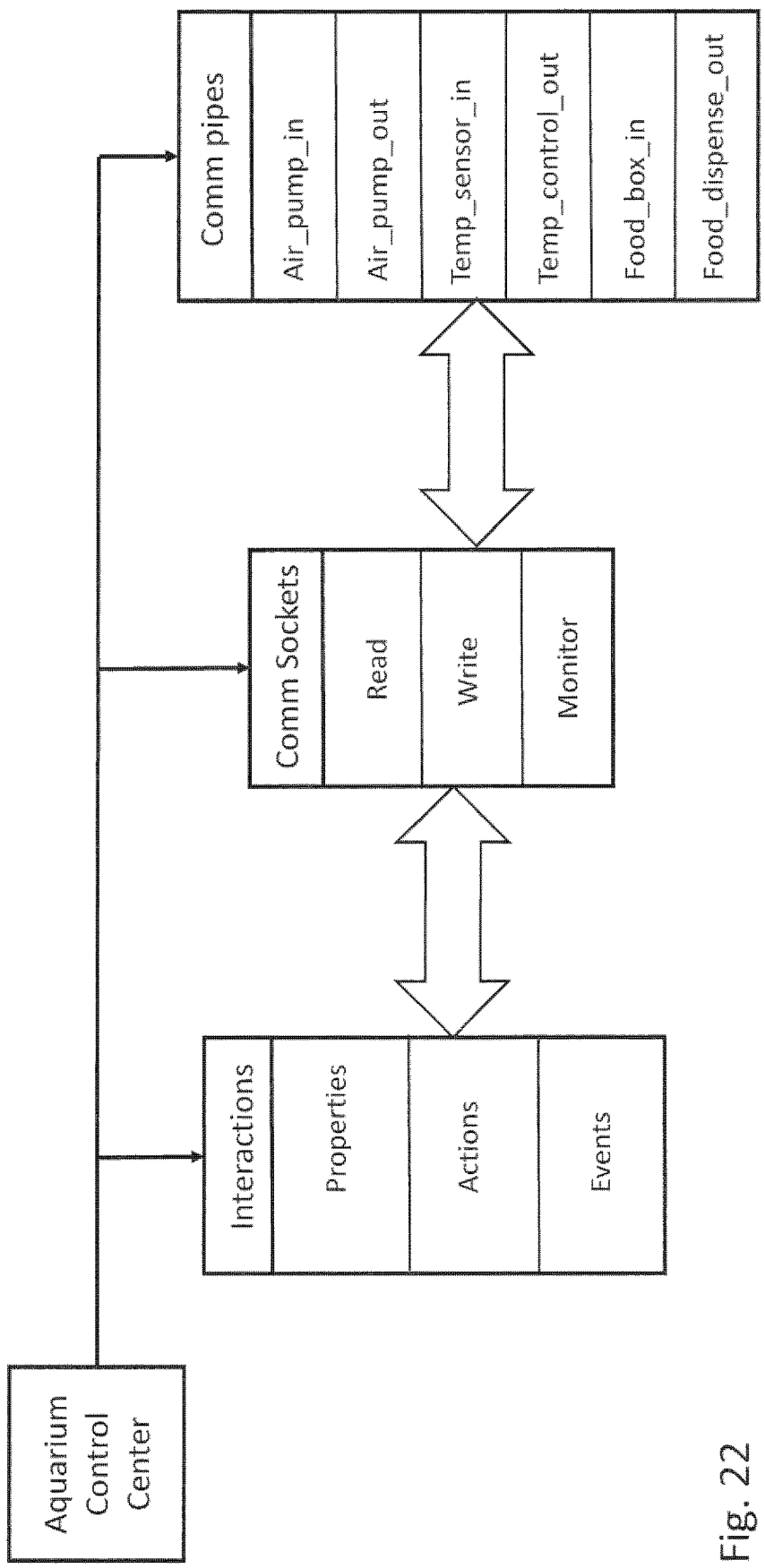
FIG. 22 illustrates the interrelationship of the Interaction, Communication Sockets and USB Communication Pipes in the Thing Description (TD) document for the USB Aquarium Control Center shown in FIG. 19.

Each functional unit has the specific functional model definition shown in the right column in FIG. 19. Based on the functional model, the corresponding Thing Model with the "Property", "Action" and "Event" interaction patterns are shown in FIG. 20. The equivalent functional implementation in USB is shown in FIG. 21. The corresponding USB description hierarchy and the functional interfaces and endpoints are shown in FIG. 21. USB Endpoints Functions are defined in the middle column while the Communication Pipes are listed in the rightmost column. Software communication sockets structures are defined in order to bridge the physical definition of the endpoint parameters of the USB device with the Thing Interaction model. As shown in FIG. 22, the Thing Description Interaction "Properties" and "Action" are realized by passing through the "Comm Sockets" read/write command to access the USB device data via the corresponding "Comm Pipes". The Interaction "Events" initiates the "Comm Sockets" monitor command to check out the corresponding USB I/O status periodically and return an event alarm when the state changes.

All of the embodiments of the present invention may be used with secure authentication and communication protocols and application layers to ensure security and prevent cyberattacks.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of enabling a USB I/O device to operate as an IoT device, comprising:
   providing a USB I/O device;
   providing a network interface module (NIM) having a USB signal port, wherein the USB I/O device is plugged into the USB signal port, the network interface module further comprising an interface in data communication with a network, USB host controller circuitry, a USB communication interface in data communication with the USB host controller circuitry and logic circuitry that is in data communication with the USB communication interface, wherein the network interface module (NIM) is configured to process a Thing Description (TD) Document and a corresponding specific USB Device Description Extension and utilize a Thing Description Interaction Model to model the function of the USB I/O device plugged into the USB signal port, the logic circuitry being configured to expose the IoT API to a network in accordance with the Thing Description (TD) Document, wherein the Thing Description (TD) document defines Properties, Actions and Events interactions, whereby when the API is called, the logic circuitry provides a command to drive the USB I/O device accordingly;
   providing a central repository that is in data communication with the Internet and which comprises a database having stored therein a plurality of Thing Description (TD) documents with specific USB extensions, wherein each Thing Description (TD) document corresponds to a particular USB I/O device;
   acquiring, by the network interface module (NIM), the vendor and product identifications of the USB I/O device plugged into the USB signal port of the network interface module;
   querying, by the network interface module (NIM), the database of the central repository for the Thing Description (TD) document with specific USB extension that corresponds to the acquired vendor and product identifications of the USB I/O device plugged into the USB signal port of the network interface module (NIM);
   retrieving, by the network interface module (NIM), the Thing Description (TD) documents with USB extension that correspond to the acquired vendor and product identifications; and
   parsing, by the network interface module (NIM), the retrieved Thing Description (TD) document with USB I/O device description extension to construct the IoT Interaction API and interfacing command to drive the USB I/O device to perform I/O functions.

2. The method according to claim 1 wherein acquiring the vendor and product identifications includes executing, by the network interface module (NIM), an enumeration process on the USB I/O device plugged into the USB signal port in order to establish an interface with the USB I/O device and acquire the vendor and product identifications.

3. The method according to claim 1 wherein the network interface module (NIM) uses the acquired vendor and product identifications as query keys for accessing and querying the central repository.

4. The method according to claim 1 wherein the plurality of Thing Description (TD) Documents with specific USB extensions stored in the database of the central repository are indexed by the USB vendor and product identifications.

5. The method according to claim 1 further comprising providing a web service on the central repository that allows the network interface module (NIM) to use the Internet to query the central repository and retrieve the specific Thing Description (TD) Documents that have the specific USB extension.

6. A method of enabling a USB I/O device to operate as an IoT device, comprising:
   providing at least one USB I/O device;
   providing a local communication network;
   providing an IoT Network Gateway comprising a first interface in data communication with the Internet and a second interface in data communication with the local communication network;
   providing at least one Thin Interface Module comprising a processor, an interface in data communication with the local communication network and a USB signal port, wherein the USB I/O device is plugged into the USB signal port, the processor of the Thin Interface Module including firmware that implements USB enumeration of the USB I/O device plugged into the USB signal port, the Thin Interface Module including USB host controller circuitry, a USB communication interface in data communication with the USB host controller circuitry and logic circuitry that is in data communication with the USB communication interface, wherein the Thin Interface Module is configured to process a Thing Description (TD) Document and a corresponding specific USB Device Description Extension and utilize a Thing Description Interaction Model to model the function of the USB I/O device plugged into the USB signal port, the logic circuitry being configured to expose the IoT API to a network in accordance with the Thing Description (TD) Document, wherein the Thing Description (TD) document defines Properties, Actions and Events interactions, whereby when the API is called, the logic circuitry provides a command to drive the USB I/O device accordingly;
   providing a central repository that is in data communication with the Internet and which comprises a database having stored therein a plurality of Thing Description (TD) documents with specific USB extensions, wherein each Thing Description (TD) document corresponds to a particular USB I/O device;

utilizing the processor of the Thin Interface Module to execute an enumeration process of the USB I/O device plugged into the USB signal port in order to acquire vendor and product identifications of said USB I/O device;

searching, by the IoT Network Gateway, the database of the central repository for the Thing Description (TD) document with specific USB extension that corresponds to the acquired vendor and product identifications;

retrieving, by the IoT Network Gateway, the Thing Description (TD) documents with USB extension that correspond to the acquired vendor and product identifications; and parsing, by the IoT Network Gateway, the retrieved Thing Description (TD) documents in order to (i) construct communication pipes that are compatible with the USB I/O device plugged into the USB signal port and (ii) construct communication handles that match the Thing Interaction Model of the USB I/O device plugged into the USB signal port of the Thin Interface Module.

7. The method according to claim 6 wherein the processor of each Thin Interface Module is programmed to execute a USB data transfer communication protocol over the local communication network in order to provide distributed USB communication pipes for transfer USB data over the local communication network to and from the IoT Network Gateway.

8. The method according to claim 6 wherein the processor of the IoT Network Gateway includes firmware that enables the IoT Network Gateway to discover the Thin Interface Module and establish the network connectivity between the IoT Network Gateway and the Thin Interface Module.

9. The method according to claim 6 wherein the processor of the IoT Network Gateway includes firmware that enables the IoT Network Gateway to query the central repository for the Thing Description Document of the USB I/O device plugged into the USB signal port of the Thin Interface Module.

10. The method according to claim 6 wherein the processor of the IoT Network Gateway includes firmware that enables the IoT Network Gateway to parse the Thing Description (TD) Document to establish communication with the USB I/O devices plugged into the USB signal port of the Thin Interface Module.

* * * * *